United States Patent [19]

Sinn

[11] 4,133,031

[45] Jan. 2, 1979

[54] ELECTRONIC SPEED RATING CALCULATOR AND METHOD

[75] Inventor: Robert S. Sinn, New York, N.Y.

[73] Assignee: Esrac Computer Corporation, New York, N.Y.

[21] Appl. No.: 789,123

[22] Filed: Apr. 20, 1977

[51] Int. Cl.$^2$ .............................................. G06F 7/38
[52] U.S. Cl. .............................. 364/412; 235/92 TA; 364/715; 364/900
[58] Field of Search .......... 235/152, 156, 193, 92 TA, 235/92 TS; 364/200, 412, 715, 900

[56] References Cited

U.S. PATENT DOCUMENTS

| | | | |
|---|---|---|---|
| 2,595,153 | 4/1952 | Malmgren | 235/87 R |
| 3,569,689 | 3/1971 | Comorau | 235/193 |
| 3,810,627 | 5/1974 | Levy | 235/92 GA X |
| 4,031,376 | 6/1977 | Corkin, Jr. | 235/156 |

Primary Examiner—David H. Malzahn
Attorney, Agent, or Firm—Stephen E. Feldman; Marvin Feldman

[57] ABSTRACT

Apparatus and method are set forth for calculating a comparative speed rating for an entrant in a race such as a horserace so that the entrants performance can be compared with the performance of other entrants. The speed rating is determined in accordance with a formula which is based on a linear relationship between speed and distance over a particular distance for a particular class of entrant and where the speed rating for an entrant other than the winner is determined over the actual distance covered by the non-winning entrant in the same time as the winner. The specific equation to determine the speed rating is as follows:

$$SR = \frac{\frac{(f60 - L)}{(t)} + .07f - 4.92}{0.08}$$

Where f is the length of the race in furlongs
Where L is the number of lengths horse was behind the winner
where t is the time of the winner in seconds.

2 Claims, 10 Drawing Figures

ELECTRONIC SPEED RATING CALCULATOR AND METHOD

BACKGROUND OF THE INVENTION

The present invention relates to apparatus and method for calculation and more particularly to apparatus and method for a speed rating for an entrant in a speed contest from predetermined constants and factors taken from previous race results. The present invention further relates to calculators for executing fixed arithmetic functions under the control of read-only storage programs.

In the prior art, there are many methods for calculating a speed rating for race entrants such as racehorses.

An animals ability to race is a function of his innate ability as modifier of his physical condition at the time of the race. That is, an animal in peak condition can race over a given distance at a certain average speed — that individual is now racing at this ultimate capacity and no further amount of training can improve his performance. The innate ability to race for the individuals of any species has a bell shaped curve, the same as all other physical and performance characteristics such as height or intelligence.

The individuals of a species tend towards a norm (the peak of the bell shaped curve) with exceptional individuals out at the tails on either end of the bell.

For many years horse racing enthusiasts have been seeking a method to evaluate a horses innate running capacity at various distances. This is difficult for several reasons:

1. Horses race at many different distances and there is great difficulty in relating performances at the different distances. For example if you knew the racing ability of horse A at 1 mile and the racing ability of horse B at 1¼ miles who would be the faster at 1¼ mile?

2. The past performances of all horses in a race are published in the Daily Racing Form, however only the time of the winner is given. The number of lengths that each other horse in a race was behind the winner at the finish is also given and the rule of thumb is to add one fifth of a second to the winning time for each length behind the winner. This rule of thumb is only accurate if the horses are running at the exact speed of one furlong (60 lengths) per 12 seconds and is inaccurate for all other speeds.

3. The same horse will run at different speeds on different tracks. This difference is caused by the track structure and the track condition. There are long term variations (track structure) and short term variations (weather), amount of scraping and etc.

A horses racing class is related to his position on the bell shaped performance curve. A horse of high class (out on the high side tail of the bell) will beat a horse of average class (at the peak of the bell) at any typical racing distance. Higher class horses tend to perform better than lower class horses at all racing distances.

The problem is how to rate a horse's racing ability such that:

1. Horses of the same class average the same rating at all distances.

2. Horses of different class have different ratings on an ascendant scale with performance.

3. Horses taken individually on the average have the same speed rating at all distances.

The present speed rating systems do not meet the criteria as stated above. In most systems such as the Daily Racing Form, one point is subtracted from 100 for each fifth of a second the horses performance was higher than the track record at that distance. This system does not meet the criteria stated above for the following reasons:

1. One fifth of a second at a distance is much less important than one fifth of a second at a sprint.

2. The track records at different distances could have been set by horses of different class. The track record is a function of the horse that set the record.

3. The rule of thumb that one-fifth second equals one length is not accurate.

In order to generate speed ratings that meet the three criteria set out above a basic concept with a simple equation is necessary.

Other systems are discussed in a book by Andrew entitled Picking Winners. One particular system employs matrix tables which plot time and distance with resultant lines, being various speed ratings. One then can presumably compare two different horses by determining each ones speed rating and then by comparing the speed ratings. This is inherently inexact since there is no overall theory to determine the speed ratings, it is all done empirically. To compound this, there is another table for non-winning horses. This also plots distance and time and is also empirical, however, when these empirical results are added to the previous results, the final comparison is even more obtuse because of the inherent inaccuracy of empirical systems.

Although there are many calculators for executing arithmetic functions, there was no calculator capable of executing an equation for calculating a speed rating based upon predetermined constants and factors taken from previous race results.

SUMMARY OF THE INVENTION

Therefore, it is a primary object of the present invention to calculate a speed rating from an entrant in a sporting event such as a racehorse by a method that employs a linear relationship between speed and distance for entrants of the same class, parallel linear relationship between entrants of different classes and a linear relationship between speed and distance for a particular entrant and where taking into consideration these linear relationships a specific equation is employed to determine the winner. The equation is as follows:

$$SR = \frac{\frac{(f60 - L)}{(t)} + .07f - 4.92}{0.08}$$

Where f is the length of the race in furlongs
Where L is the number of length horse was behind the winner.
Where t is the time of the winner in seconds It is a further object of the present invention to calculate a speed rating for an entrant in a sporting event such as a horserace based upon comparative results of the entrant from a previous race and constant factors applicable to the classification of the entrant.

It is yet another object of the present invention to calculate a speed rating for an entrant in a sporting event by the following equation:

$$SR = \frac{\frac{(f\,60 - L)}{(t)} + .07f - 4.92}{0.08}$$

It is a further object of the present invention to calculate a speed rating for an entrant in a sporting event such as a horserace based upon distance and time inputs.

It is another object of the present invention to calculate a speed rating for an entrant in a sporting event such as horseraces based upon distance and time inputs by a calculator including means for entering data and control information, means for displaying the input data and the result, means for storing the data of the control information, means for computing a speed rating given the input data and program control, means for controlling the sequence of operations of the speed rating calculator.

It is a feature of the present invention that the method for calculating a speed rating according to the present invention provides an accurate speed rating which considers all pertinent factors.

It is another feature of the present invention that apparatus according to the present invention may be carried upon the person to sporting events so that speed ratings may be instantaneous and efficiently calculated before and after an event.

A still further feature of the invention is to allow any person without any knowledge of mathematics or racing characteristics of horses to quickly and easily compute with the aid of a calculator the speed rating of any horses in any race. The user merely inputs the distance of the race, the lengths behind the winner, and the winners times the computer automatically computes a speed rating. The speed rating as computed will automatically compensate for the exact variation of speed and distance that the rule of thumb (1/5 sec. = 1 length) did not, and will also use a discovered linear relationship between class and distance to correlate running times of different distances to class.

Accordingly, the method of the present invention includes the steps of classifying the entrant relative to other entrants in the same or similar sporting events. The speed rating of the entrant is calculated according to the mathematical formula shown above, which formula includes the pertinent factors for determining a speed rating for each entrant independent of variations such as track and classification of the entrant. Thus, by the method of the present invention, a speed rating is calculated which is general in its application in that the same speed rating applies for the entrant regardless of the distance of the race to be run.

The apparatus of the present invention includes means for data entry such as a keyboard similar to keyboards commonly used by 4-function arithmetic calculators, a random access memory for storing input data and other intermediate and output data, an arithmetic unit for calculating a speed rating given the input data, a display device for displaying selected data, and a read-only storage program control for controlling the sequence of steps to be executed in the calculation of a speed rating.

These and other objects, features, and advantages of the present invention together with the operation of the invention will be understood by reference to the following detailed description taken together with the following drawings.

DETAILED DESCRIPTION OF THE INVENTION

For many years horse racing enthusiasts have been seeking a method to evaluate a horses innate running capacity at various distances. This is difficult for several reasons:

1. Horses race at many different distances and there is great difficulty in relating performances at the different distances. For example, if you knew the racing ability of horse B at 1⅛ miles and the racing ability of horse A at 1 mile, who would be the faster at 1¼ miles?

2. The past performances of all horses in a race are published in the Daily Racing Form, however, only the time of the winner is given. The number of lengths that each other horse in a race was behind the winner at the finish is also given and the rule of thumb is to add one fifth of a second to the winning time for each length behind the winner. This rule of thumb is inaccurate.

3. The same horse will run at different speeds on different tracks. This difference is caused by the track structure and the track condition. There are long term variations (track structure) and and short term variations (weather) and etc.

A horse's racing class is related to this position on the bell shaped performance curve. A horse of high class (out on the high side tail of the bell) will beat a horse of average class — (at the peak of the bell) at any typical racing distance. Higher class horses tend to perform better than lower class horses at all racing distances.

The problem is how to rate a horses racing ability such that:

1. Horses of the same class average the same rating at all distances.

2. Horses of different classes have different ratings on an ascendant scale with performance.

3. Horses taken individually on the average have the same speed rating at all distances.

The present speed rating systems do not meet the criteria as stated above. In most systems such as the Daily Racing Form one point is subtracted from 100 for each fifth of a second the horses performance was higher than the track record at that distance. This system does not meet the criteria stated above for the following reasons:

1. One fifth of a second at a distance is much less important than one fifth of a second at a sprint.
2. The track records at different distances could have been set by horses of different classes. The track record is a function of the horse that set the record.
3. The rule of thumb of one fifth second equals one length is not accurate.

Figure 1:
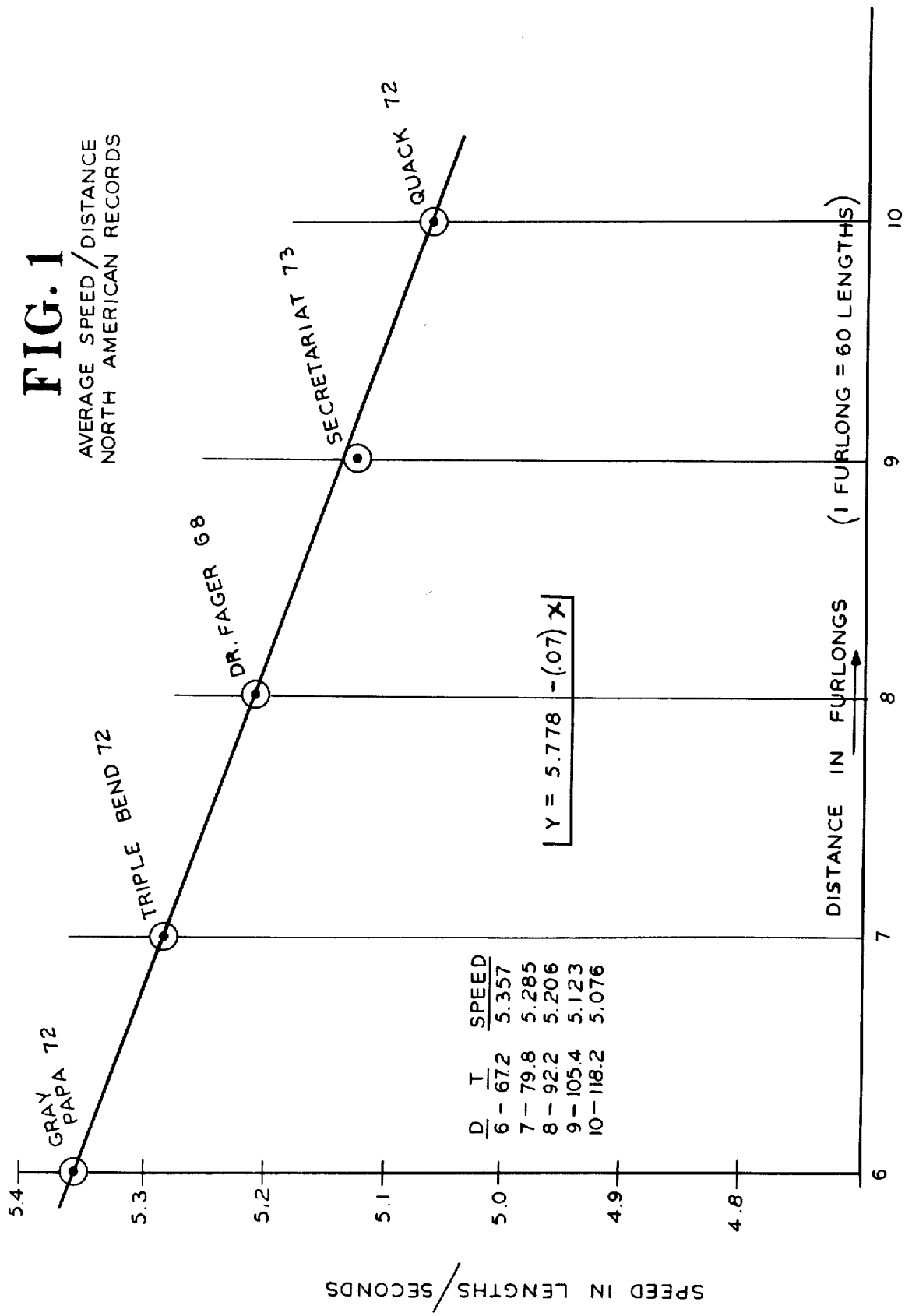
FIG. 1 is a graph showing the speed in lengths/second as a function of distance in furlongs showing the North American record speeds at distances 6 to 10 furlongs.

In all the present systems of speed ratings the focus is on the time of the race. If the average winning times of horses of the same class are plotted as a function of the distance of the race the resultant curve is non linear, however, if the average speed is plotted as a function of distance, the resultant curve is a straight line. This relationship is shown in FIG. 1 for North American Records at distance from 6 furlongs to 1¼ miles.

Substitute Cr in previous equation
research on the speed - distance characteristics of all classes of race horses from distance of 5 furlongs to 1½ miles has confirmed that all classes of horses exhibit the same straight line (linear) relationship of average speed verses distance.

This basic discovery of the linear relationship of speed and distance for horses of the same class now allows for a system which fulfills the original requirements of the speed rating system. The slope of the line relating North American Records was found to be about exactly the same as the slope of the line relating horses of all different classes of horses. This slope is approximately (0.07) length/second furlong.

Figure 2:
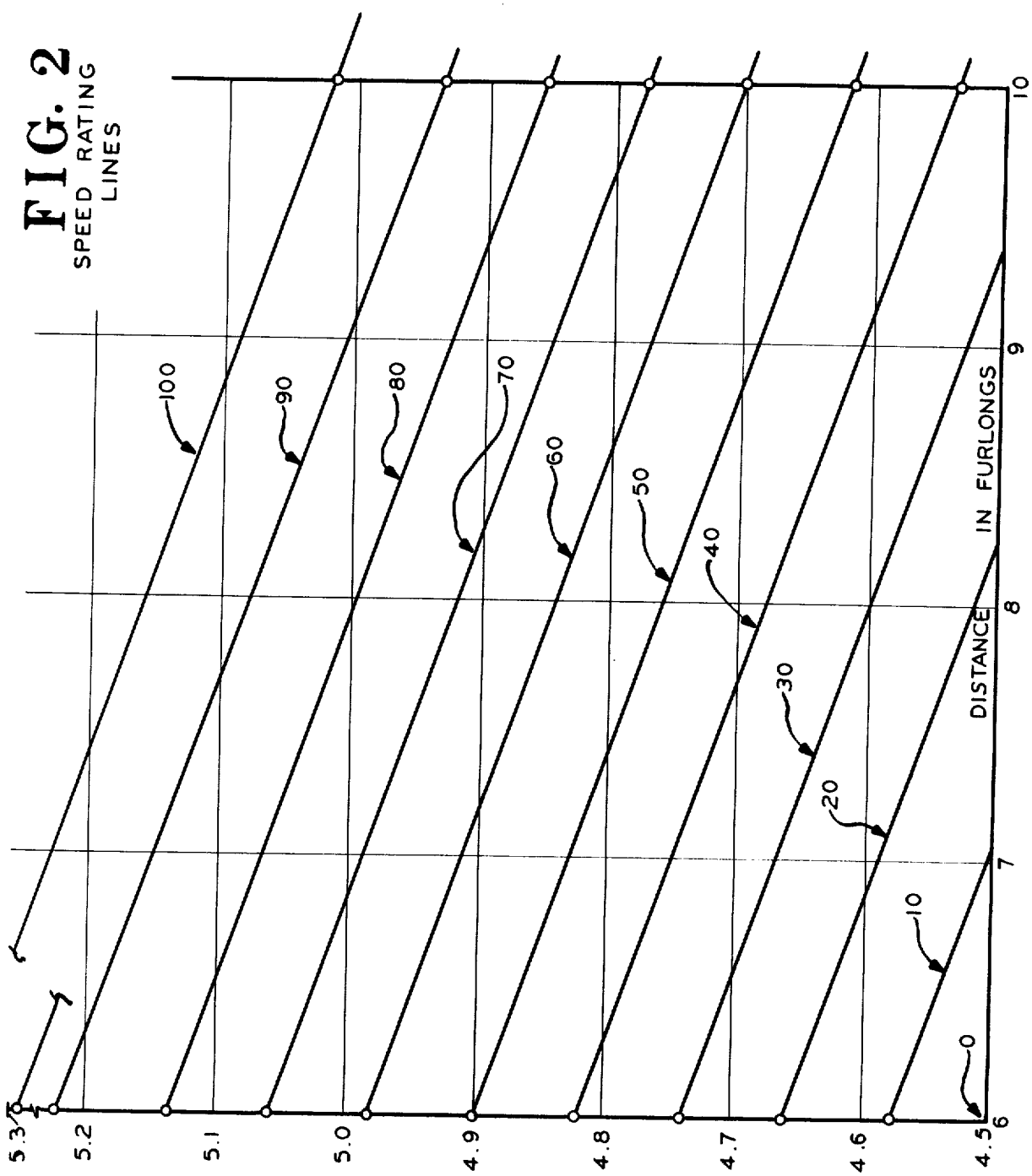
FIG. 2 is a graph of speed in lengths/second versus distance in furlongs showing speed rating lines for ratings 0 to 100.

FIG. 2 illustrates the generator of the speed rating system. The ordinate is the average speed over the distance. The abcissa is the distance in furlongs. The desire is to make a scale of 0–100 where the vast majority of all performances will fall within that scale. The rating of 100 is chosen as follows: an optimum speed at 6 furlongs is 5.3 lengths per second (this is approximately the North American Record — See FIG. 1) this is assigned a speed rating of 100, a minimum speed at 6 furlongs is approximately 4.5 furlongs per second and is assigned a speed rating of 0. The 100 speed rating line is then drawn for the ordinate 5.3 with a slope of (−0.07). Each 0.08 length/sec. at 6 furlongs reduces the speed rating by 10 until a speed rating of 0 corresponding to a speed of 4.5 at 6 furlongs. FIG. 2 then illustrates the family of speed rating lines so generated.

Let f = Distance of race in furlongs.
Let S = Average speed of runner in lengths/sec.
Let Sr = Speed rating
Let Cr = The value where the r speed rating intercepts the vertical axis (speed in lengths/sec.) at zero distance (f =0).
Let t = Race time of winner in seconds The equation for the 100 speed rating line is:

$$S_{100} = 5.72 - (0.07)f$$

The equation for the 90 speed rating is:

$$S_{90} = 5.64 - (0.07)f$$

The equation for the 80 speed rating is:

$$S_{80} = 5.56 - (0.07)f$$

$$\ldots$$

$$S_0 = 4.92 - (0.07)f$$

The problem now is to generate the speed rating as a continuous function of the average speed of the runner at the distance.
Therefore $$S = Cr - (0.07)f$$

$$Cr = 4.92 + Sr(0.08)$$

Substitute Cr in previous equation
Therefore $$S = 4.92 + Sr(0.08) - (0.07)f$$

Solve for Sr $$Sr = \frac{S + (.07)f - 4.92}{(.08)}$$

For winner $$S = (60 f/t)$$

Therefore (1)

$$Sr = \frac{\frac{60f}{t} + (.07)f - 4.92}{(.08)}$$

$$Sr = \frac{750 f}{t} + 875f - 61.5 \quad (1)$$

Equation 1 then relates the speed rating as a function of time and distance.

This equation must be modified for non-winners because their winning time is not given in the Daily Racing Form. Many different methods of calculating the losing horses average speed over the distance are possible. One method is:

Let L = lengths behind winner at the time winner crosses the finish.
Let $S_2$ = Average speed of the loser.
Therefore $$S_2 = \frac{f(60) - L}{t} \quad (2)$$

$$SR = \frac{\frac{(f60 - L)}{(t)} + .07f - 4.92}{0.08}$$

Equation 2 is then used for both winners and losers with L2=0 for winners.

Extensive research has proved that this equation generates a consistent family of speed ratings satisfying the original requirements.

Once the equation for calculating speed rating has been determined which is general enough to cover all variables involved in a sporting event such as a horserace, the method for executing the calculation becomes apparent and is as follows:

1. Determine an optimum average speed based upon superior performance for the distance.
2. Determine the minimum average speed which experience has shown to have 0 value for the particular kind of sporting event in question.
3. Determine intermediate values between the optimum and the minimum for speeds at various distances for races.
4. Then solve using the formula $$SR = \frac{\frac{(f\,60 - L)}{(t)} + .07f - 4.92}{0.008}$$

The equation shown above may be executed by a special purpose digital computer or by a sequence of program steps executed on a general purpose digital computer.

Figure 3:
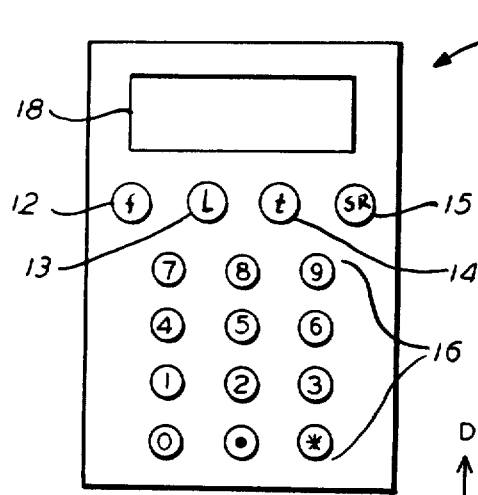
FIG. 3 is a front isometric view of a hand-held calculator according to the present invention.

Referring to FIG. 3, an electronic speed rating calculator 10 may be packaged as a hand-held calculator having function keys 12, 13, 14 and 15 for identifying the data to be entered on data entry keys 16. A display 18 is included to provide visual display of input data and speed rating result.

Figure 8:
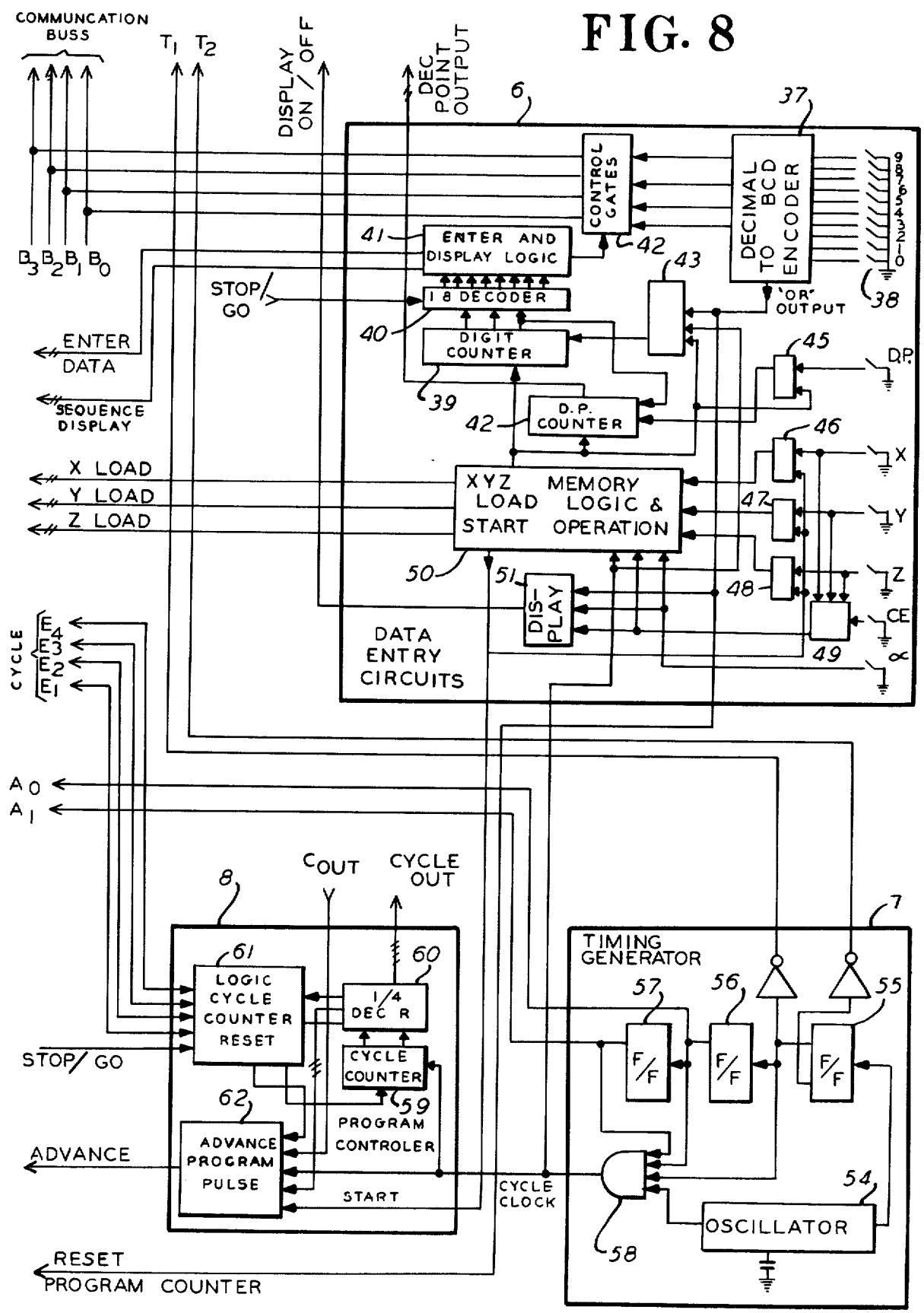
FIG. 8 is a block diagram of data entry 6, timing generator, and the program controller.

Referring briefly to FIG. 8, the block diagram 6 of the speed rating calculator includes data input means 38 which could be keyboard 12–16 shown in FIG. 3. The data entry means is connected to arithmetic unit 1 which executes arithmetic functions in the calculator and to random access memory 2 for storage of entered data. Program control read-only storage 4 controls the sequence of arithmetic and logic functions performed by the calculator. Control and timing logic 8 interacts with all other inputs, data input means 6, arithmetic unit 1, random access memory 2, program control read-only storage 4 and display 3 to control execution of the speed rating calculation.

Figure 4:
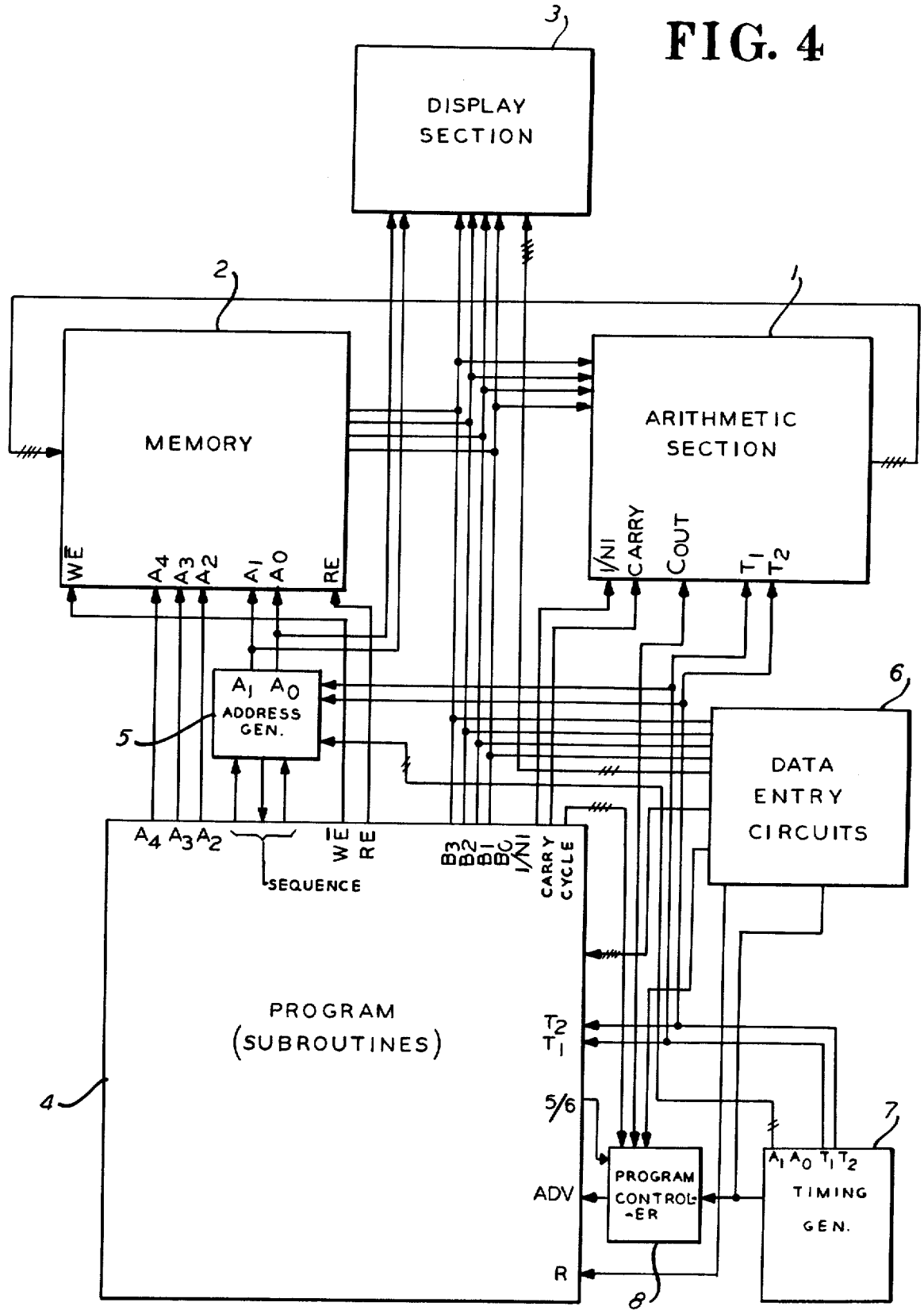
FIG. 4 is a block diagram of the micro computer of this invention.

Referring now to FIG. 4, the operation of a calculator according to the present invention for calculating a speed rating according to the present invention contains the following steps:

(a) Data entry of distance in furlongs, gap in lengths, and t in seconds.
(b) Multiplying f by 60.
(c) Adding L to −60f and storing the result.
(d) Dividing the result by t and storing the new result.
(e) Calculating 0.07f.
(f) Adding 0.07f to the result previously calculated.
(g) Adding a constant (4.92) to the calculation.
(h) Dividing by 0.008.
(i) Storing and displaying the result which is the speed rating.

Figure 7:
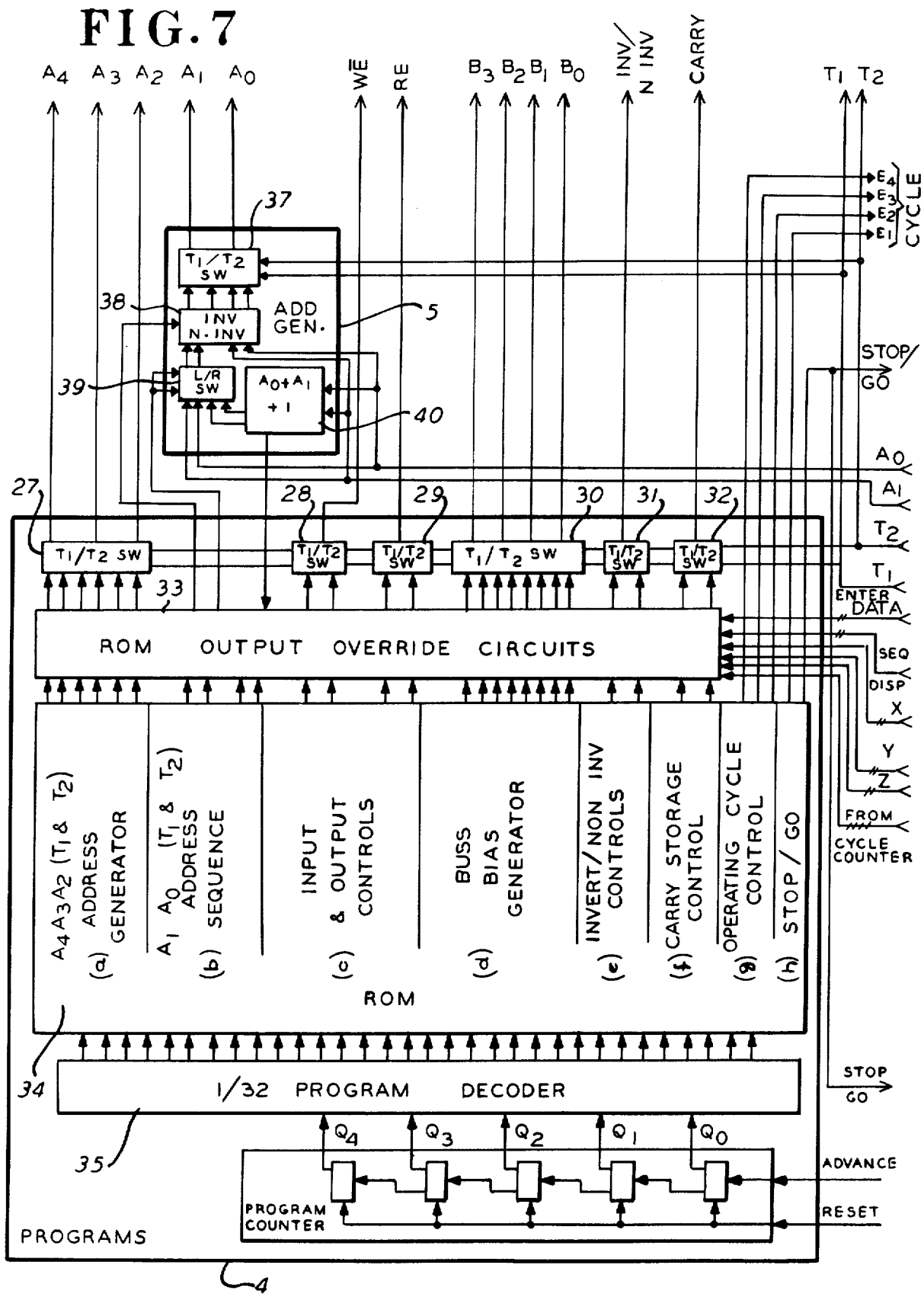
FIG. 7 is a diagram of the program and address generator of the microcomputer.

Program control read-only storage 4 shown in FIG. 7 contains a 28-step routine for calculating a speed rating given a distance in furlongs, a gap between the first place and a nth place finisher in lengths and time in seconds. The following is a listing of the program steps to execute the speed rating equation.

| PROGRAM | DEC. | FUNCTION Ref. to RAM Loc. | NOTES |
|---|---|---|---|
| 00000 | (0) | Enter Data | See $N_1$ & $N_2$ |
| 00001 | 1 | Clear 00000 | |
| 00010 | 2 | Clear 11000 & 11100 | |
| 00011 | 3 | Add 00100 to 11000 & 11100 | Six Times (6f) |
| 00100 | 4 | Shift Up 11000 & 11100 | (60f) |
| 00101 | 5 | Complement 11000 & 11100 | (−60f) |
| 00110 | 6 | Add 01000 to 11000 & 11100 | (−60f + L) |
| 00111 | 7 | Clear 00000 | |
| 01000 | 8 | Shift Up 11000 & 11100 | Prep. for Division |
| 01001 | 9 | Add 10000 to 11000 & 11100 | Divide by t |
| 01010 | 10 | Transfer 00000 to 01000 | Place result in 'L' Loc. |
| 01011 | 11 | Clear 00000 | |
| 01100 | 12 | Clear 11000 & 11100 | |
| 01101 | 13 | Add 00100 to 11000 and 11100 | Six Times (6f) |
| 01110 | 14 | Add 00100 to 11000 & 11100 | One Time (7f) |
| 01111 | 15 | Shift Down 11000 & 11100 | (.7f) |
| 10000 | 16 | Shift Down 11000 & 11100 | (0.7f) |
| 10001 | 17 | Add 01000 to 11000 & 11100 | 'L' + .07f |
| 10010 | 18 | Complement 11000 & 11100 | −('L' + .07f) |
| 10011 | 19 | Add 01100 to 11000 & 11100 | Add 4.92 |
| 10100 | 20 | Clear 00000 | |
| 10101 | 21 | Shift Up 11000 & 11100 | Prep. for Division |
| 10110 | 22 | Shift Up 11000 & 11100 | Prep. for Division |
| 10111 | 23 | Shift Up 11000 & 11100 | Prep. for Division |
| 11000 | 24 | Shift Up 11000 & 11100 | Prep. for Division |
| 11001 | 25 | Add 10100 to 11000 & 11100 | Divide by 8 |
| 11010 | 26 | Add (0101) to 00000 | Add 5 |
| 11011 | 27 | Shift Down 00000 | (Round off) |
| 11100 | 28 | Stop | |
| 11101 | 29 | | |
| 11110 | 30 | | |

| $N_1$: Prog. for Entering Data | | |
|---|---|---|
| PROG. | DEC. | FUNCTION |
| 0000 | 0 | Display (Stop) |
| 0001 | 1 | Enter 1st Dig. |
| 0010 | 2 | Display (Stop) |
| 0011 | 3 | Enter 2nd Dig. |
| 0100 | 4 | Display (Stop) |
| 0101 | 5 | Enter 3rd Dig. |
| 0110 | 6 | Display (Stop) |
| 0111 | 7 | Enter 4th Dig. |
| 1000 | 8 | Display (Stop) |

| $N_2$: Prog. for Transferring Data | | |
|---|---|---|
| PROG. | DEC. | FUNCTION |
| 0 | 1 | Standardize |
| 1 | 2 | Transfer |

Figure 6:
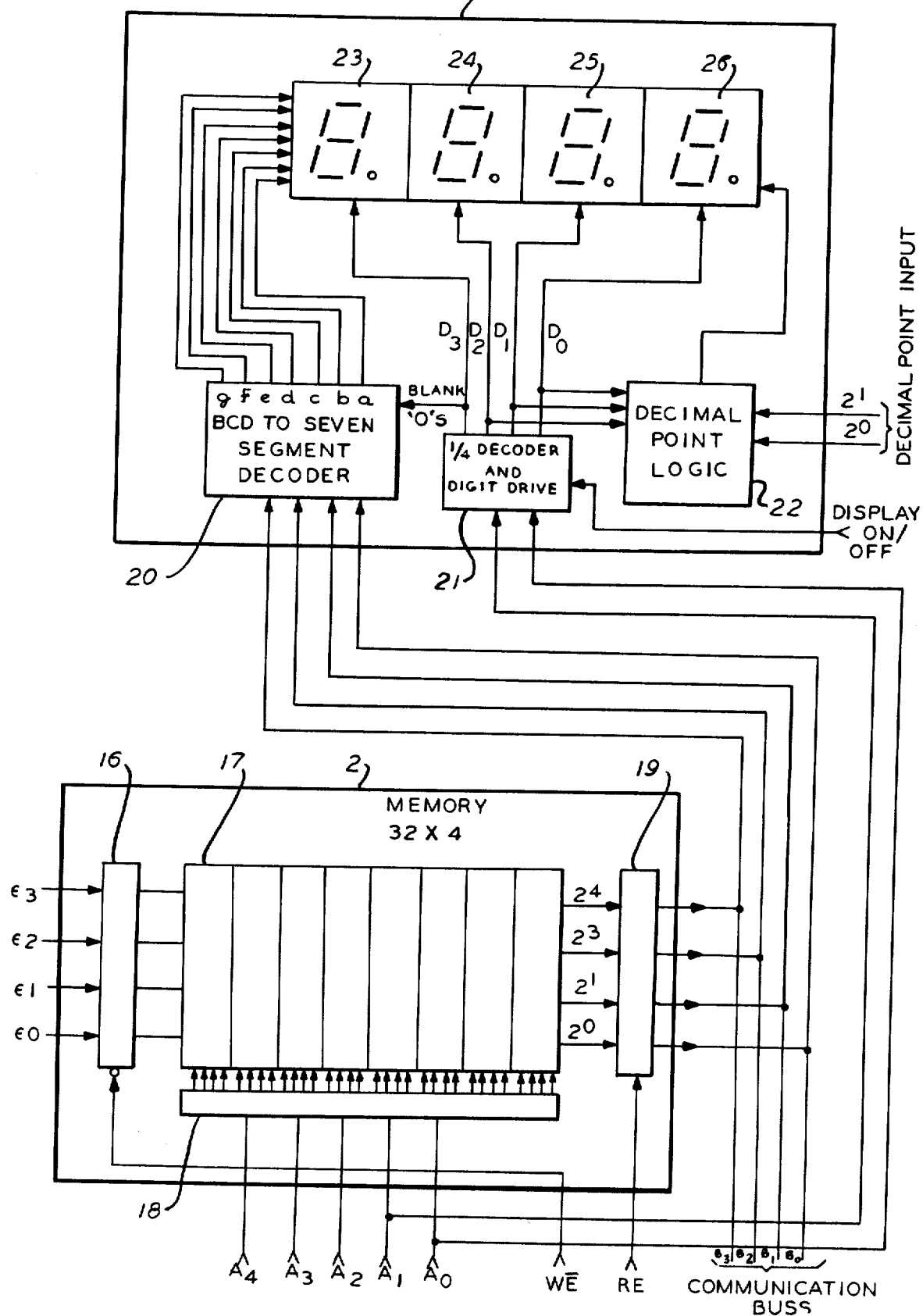
FIG. 6 is a diagram of the display section of the microcomputer.

As can be seen from the method steps outlined above, when the program control read-only storage initiates the routine to calculate a speed rating, the first step is a data entry. Data is entered in random access memory address 0. Random access memory 24 shown in FIG. 6 is a 32-location memory wherein each location contains a 4-bit byte of binary coded decimal data. Four memory locations or 4 bytes of data comprise a memory word. The mempory is organized in the following manner:

| WORD | DATA STORED |
|------|-------------|
| 0 | Temporary Storage and Display |
| 4 | f in furlongs |
| 8 | L in lengths |
| 12 | Constant 1–4.92 |
| 16 | t in seconds |
| 20 | Constant 2–0.008 |
| 24 | Operating Storage |
| 28 | Operating Storage |

Data is first entered in random access memory location 0. As the data is entered it is displayed on the display device. After the data has been entered in temporary storage 0 it is then transferred to the appropriate storage location determined by the particular data being entered such as f, L, or t.

After data has been entered and is properly stored in the appropriate locations, an add command is executed to execute a multiply-by-6 operation on the contents of word 4 (f). Next, a shift operation occurs to multiply the 6f by 10 to obtain 60f. Next, a complement operation occurs to obtain the negative of 60f. The add operation is executed to add the contents of word 8 (L) to −60f previously calculated. Then the next quantity L-60f is divided by t and the result is placed in word 8. 6f is again calculated and then added to f to achieve 7f. This factor is then divided by 10 and again by 10 to achieve 0.07f. An add operation adds 0.07f to word 8 wich is the factor L-60f divided by t previously calculated. Next, the contents of word 12 (4.92) are added to the result obtained by prior operations and the total is divided by 0.008. The result is then stored in word 0 for display.

The basic equation is divided into separate functions and the order of performing these functions is as follows:

1. Multiply 60 by f: 60f
2. Deduct L from the multiplication result: (60f−L)
3. Divide the result by t: (60f−L)/t
4. Multiply f by 0.07: 0.07f
5. Add the result in (3) to the result of (4): (60f−L)/t + 0.07f
6. Deduct 4.92 from the result of (5): (60f−L)/t + 0.07f − 4.92
7. Obtain solution SR by dividing 0.008 into (6) (60f−L)/t + 0.07f − 4.92

A specific computer to perform the aforementioned calculations is described hereinafter: The computer is supplied with t, L, f (enter data and load t f L locations) to prepare the operating memory sections by clearing or transfering information. These additional steps must be taken preceeding each of the above basic functions. Also, the end result is to be rounded off to the nearest full decimal digit.

A basic program for operation of the calculator is as follows:

| PROGRAM | DEC. | PROGRAM CONTROL FUNCTION Ref. to RAM Loc. | NOTES |
|---------|------|-------------------------------------------|-------|
| 00000 | (0) | Enter Data | See $N_1$ & $N_2$ |
| 00001 | 1 | Clear 00000 | |
| 00010 | 2 | Clear 11000 & 11100 | |
| 00011 | 3 | Add 00100 to 11000 & 11100 | Six Times (6f) |
| 00100 | 4 | Shift Up 11000 & 11100 | (60f) |
| 00101 | 5 | Complement 11000 & 11100 | (−60f) |
| 00110 | 6 | Add 01000 to 11000 & 11100 | (−60X + L) |
| 00111 | 7 | Clear 00000 | |
| 01000 | 8 | Shift Up 11000 & 11100 | Prep. for Division |
| 01001 | 9 | Add 10000 to 11000 & 11100 | Divide by t |
| 01010 | 10 | Transfer 00000 to 01000 | Place result in 'L' Loc. |
| 01011 | 11 | Clear 00000 | |
| 01100 | 12 | Clear 11000 & 11100 | |
| 01101 | 13 | Add 00100 to 11000 & 11100 | Six Times (6f) |
| 01110 | 14 | Add 00100 to 11000 & 11100 | One Time (7f) |
| 01111 | 15 | Shift Down 11000 & 11100 | (.7f) |
| 10000 | 16 | Shift Down 11000 & 11100 | (.07f) |
| 10001 | 17 | Add 01000 to 11000 & 11100 | 'L' + .07f |
| 10010 | 18 | Complement : 11000 & 11100 | −('L' + .07f) |
| 10011 | 19 | Add 01100 to 11000 & 11100 | Add 4.92 |
| 10100 | 20 | Clear 00000 | |
| 10101 | 21 | Shift Up 11000 & 11100 | Prep. for Division |
| 10110 | 22 | Shift Up 11000 & 11100 | Prep. for Division |
| 10111 | 23 | Shift Up 11000 & 11100 | Prep. for Division |
| 11000 | 24 | Shift Up 11000 & 11100 | Prep. for Division |
| 11001 | 25 | Add 10100 to 11000 & 11100 | Divide by 8 |
| 11010 | 26 | Add (0101) to 00000 | Add 5 |
| 11011 | 27 | Shift Down 00000 | (Round Off) |
| 11100 | 28 | Stop | |
| 11101 | 29 | | |
| 11110 | 30 | | |
| 11111 | 31 | | |

| $N_1$: Prog. for Entering Data | | | $N_2$: Prog. for Transferring Data | | |
|------|------|----------|------|------|----------|
| Prog. | Dec. | Function | Prog. | Dec. | Function |
| 0000 | 0 | Display (Stop) | 0 | 1 | Standardize |
| 0001 | 1 | Enter 1st Dig. | 1 | 2 | Transfer |
| 0010 | 2 | Display (Stop) | | | |
| 0011 | 3 | Enter 2nd Dig. | | | |
| 0100 | 4 | Display (Stop) | | | |
| 0101 | 5 | Enter 3rd Dig. | | | |
| 0110 | 6 | Display (Stop) | | | |
| 0111 | 7 | Enter 4th Dig. | | | |
| 1000 | 8(0) | Display (Stop) | | | |

The tasks commonly referred to as subroutine functions, are given in terms of memory RAM (random access memory) locations below which are sections of selected memory that are being operated on:

| Memory Address | | | | |
|-----|-----|-----|-----|-----|
| $A_4$ | $A_3$ | $A_2$ | $A_1$ | $A_0$ |
| 0 | 0 | 0 | 0 | 0 |

-continued

| Memory Address | | | | | |
|---|---|---|---|---|---|
| $A_4$ | $A_3$ | $A_2$ | $A_1$ | $A_0$ | |
| 0 | 0 | 0 | 0 | 1 | |
| 0 | 0 | 0 | 1 | 0 | Temporary Storage and Display |
| 0 | 0 | 0 | 1 | 1 | |
| 0 | 0 | 1 | 0 | 0 | |
| 0 | 0 | 1 | 0 | 1 | f |
| 0 | 0 | 1 | 1 | 0 | |
| 0 | 0 | 1 | 1 | 1 | |
| 0 | 1 | 0 | 0 | 0 | |
| 0 | 1 | 0 | 0 | 1 | L |
| 0 | 1 | 0 | 1 | 0 | |
| 0 | 1 | 0 | 1 | 1 | |
| 0 | 1 | 1 | 0 | 0 | |
| 0 | 1 | 1 | 0 | 1 | |
| 0 | 1 | 1 | 1 | 0 | 4.92 (in ROM form) |
| 0 | 1 | 1 | 1 | 1 | |
| 1 | 0 | 0 | 0 | 0 | |
| 1 | 0 | 0 | 0 | 1 | t |
| 1 | 0 | 0 | 1 | 0 | |
| 1 | 0 | 0 | 1 | 1 | |
| 1 | 0 | 1 | 0 | 0 | |
| 1 | 0 | 1 | 0 | 1 | 0.008 (in ROM form) |
| 1 | 0 | 1 | 1 | 0 | |
| 1 | 0 | 1 | 1 | 1 | |
| 1 | 1 | 0 | 0 | 0 | |
| 1 | 1 | 0 | 0 | 1 | Operating Section |
| 1 | 1 | 0 | 1 | 0 | (Add, Compliment, Subtract, etc.) |
| 1 | 1 | 0 | 1 | 1 | |
| 1 | 1 | 1 | 0 | 0 | |
| 1 | 1 | 1 | 0 | 1 | |
| 1 | 1 | 1 | 1 | 0 | |
| 1 | 1 | 1 | 1 | 1 | |

NOTE:
Each Memory Address Location Contains Four (4) Bits of BCD Storage Information.

The total memory capacity is divided into eight (8) sections. Each section consists of four (4) locations. Since each location has the capacity of four (4) binary bits, then the capacity of each section is 4 × 4 = 16 binary bits. Due to the fact that four BCD (binary coded decimal) bits represent one decimal digit, the four BCD bits, as stored in each memory location, are operated on in parallel. For this reason the memory with the total capacity of 128 binary bits was organized as 32 words × 4 bits.

Each section of the memory consists of four locations as mentioned and the sections may be defined in terms of memory address. For example: Temporary Storage and Display uses first four locations with memory address $A_4 A_3 A_2 A_1 A_0$ being from 00000 consecutively through 00011, variable f section is in address locations 00100 to 00111, L in 01000 to 01011, and t in 10000 to 10011. Fixed number 4.92 is stored as 04.92 in 01100 to 01111 locations, while the number 0.008 is stored as 0800 in 10100 to 10111 address locations. The fixed numbers are not expected to change and therefore they may be permanently stored in an ROM (read only memory) form. The last two sections of the memory, address 11000 to 11011 and 11100 to 11111 are assigned for operation and they are combined into one Operating Section. The two memory sections are needed for the case of multiplication or division, where double precision is required.

For the simplicity of notation, the program uses only the first starting location in defining the memory section. For example, the Temporary Storage is referred to as 00000, meaning a memory section with starting location of this address but four "words" long, or four consecutive locations from 00000 through 00011. The Operating Section referred to as 11000 & 11100 includes two memory sections: first section with starting location 11000 and second section with starting location 11100.

The program sequence is as follows:

The initial program, defined by a binary number 00000 (0) Enter Data, consists of entering information into the memory. According to notes $N_1$ and $N_2$, two separate subprograms are used to load the memory locations. These subprograms shall be described with the description of data entry operation. Basically, the numbers are first entered and stored in the Temporary Storage section (which is being simultaneously displayed) and then the numbers are transferred to the prescribed section according to L, T or F designation.

Program 00001 (1) Clear 00000: Clearing of Temporary Storage location 00000 is necessary because this section is used in multiplication.

Program 00010 (2) Clear 11000 & 11100: Clearing of Operating section is required because the two memory sections are used for multiplication.

Program 00011 (3) Add 00100 to 11000 & 11100: The multiplication is performed here by repeated addition of six times of variable f that was stored in memory location starting address 00100. Also the number of times added is first stored in Temporary Storage 00000 and then compared to six. Upon reaching comparison the program is advanced to the next operation.

Program 00100 (4) Shift-Up 11000 & 11100: The number in Operating Section is shifted up by one decimal position to effect the multiplication by a factor of 10 in this fixed point arithmetic operation.

Program 00101 (5) Complement 11000 & 11100: This is a preparatory step that is required in order to effect the subtraction in subsequent program.

Program 00110 (6) Add 01000 to 11000 & 11100: The subtraction is obtained by adding a complement (10's complement is used) and leaving the result in a complement form as a preparatory step for division in subsequent program 01001.

Program 00111 (7) Clear 00000: Preparatory step for division.

Program 01000 (8) Shift-Up 11000 & 11100: Preparatory step for division. The number is shifted up by one decimal point so as to obtain a result of the division to an accuracy of two decimal places.

Program 01001 (9) Add 10000 to 11000 & 11100: Division is performed here by repeated subtraction. The subtraction is obtained by adding complement and variable t stored in memory section 10000. This program also calls for recording the number of repeated subtractions that were performed until an overflow was reached. The record is kept in section 00000.

Program 01010 (10) Transfer 00000 to 01000: The result of division recorded in section 00000 is being transferred to memory section 01000. This is a preparatory step because section 00000 is required in subsequent multiplication.

Program 01011 (11) Same as 00001.
Program 01100 (12) Same as 00010.
Program 01101 (13) Same as 00011.
Program 01110 (14) Add 00100 to 11000 & 11100: Single addition of t to the number that was already multiplied six time in program 01101. This in effect accomplishes total multiplication by 7.

Program 01111 (15) Shift-Down 11000 & 11100: Total number is shifted down to effect moving decimal point up one decimal position.

Program 10000 (16) Same as 01111.

Program 10001 (17) Same as 00110 except that the result of division in step 01001 that was transferred there in step 01010 is now being added to the result of Program 10000.

Program 10010 (18) Same as 00101.

Program 10011 (19) Add 01100 to 11000 & 11100: The subtraction is effected by adding 4.92 to the complement and leaving the result in complement form as a preparatory step for subsequent division.

Program 10100 (20) Same as 00111.

Program 10101 (21) Shift-Up 11000 & 11100: This is a preparatory step for division effecting decimal point location.

Program 10110 (22) Same as 10101.

Program 10111 (23) Same as 10101.

Program 11000 (24) Same as 10101.

Program 11001 (25) Add 10100 to 11000 & 11100. Division is obtained here in similar fashion to the program 01001 with the number 8 being used here instead of variable t. The result of the division is recorded in section 00000. The result is in the form xxx.x, with decimal point one position over from the right.

Program 11010 (26) Add (0101) to 00000. Preparatory step for rounding off the end result to the nearest full decimal digit. By adding 0101 (5) to the last digit of the form xxx.x the full decimal digit in front of the decimal point is increased by one if the number in the last position is 5 or greater and is not altered if that number is smaller.

Program 11011 (27) Shift-Down 00000: Round off of display by shifting down the whole number in 00000 and discarding all digits below decimal point. The end result is in the form xxx.

Program 11100 through 11111 (28 to 32) Stop: The operation is stopped and the result displayed.

The description of the 28 steps involved in the total operation was limited to explanation of what is being done to achieve the end result. The programmed operations are performed by a computer in a form of 28 consecutive subroutines. In order to understand how the computer performs these subroutines, it is necessary to study the machine that was designed for this purpose.

Figure 5:
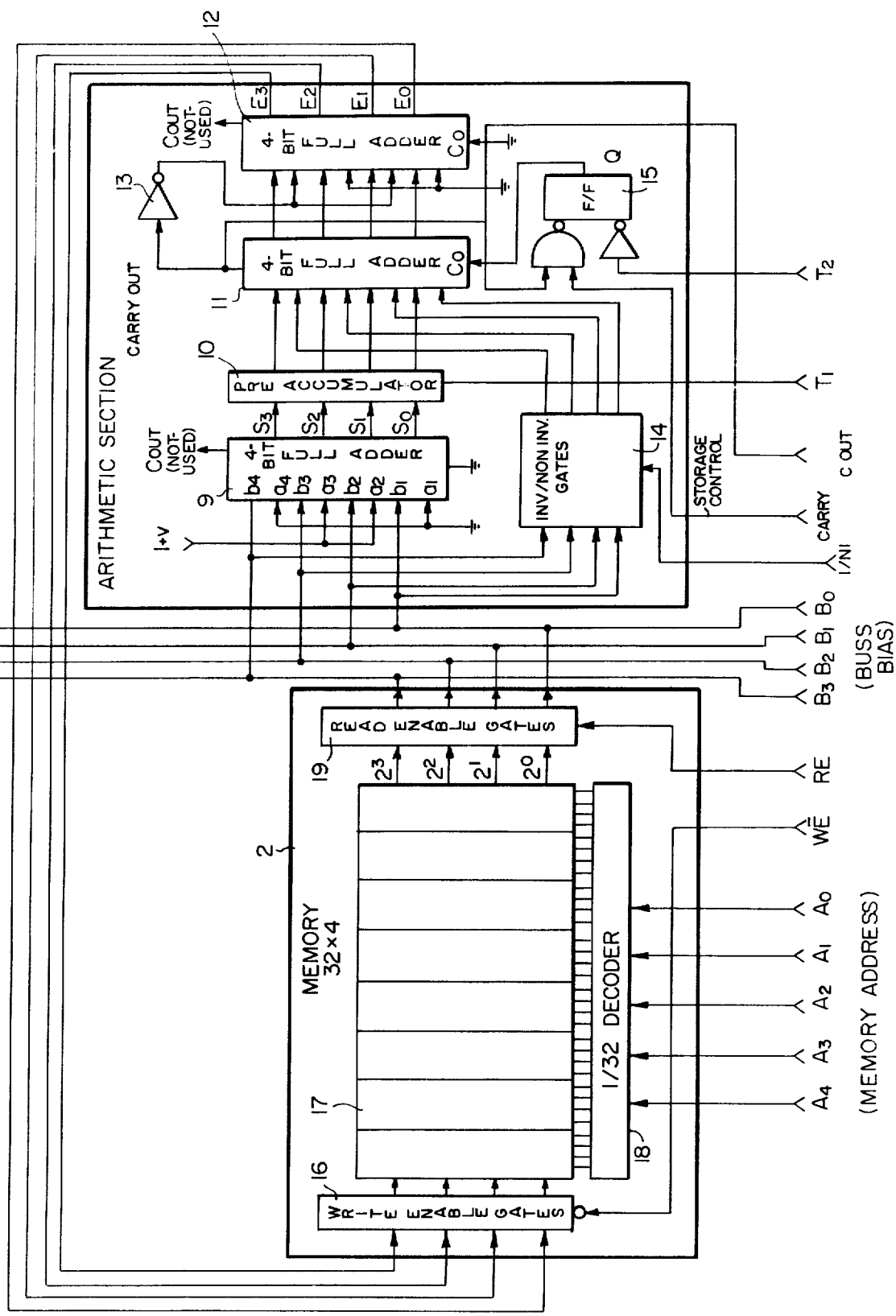
FIG. 5 is a block diagram of the details of the arithmetic and memory sections of the microcomputer.

FIG. 5 shows basic micro-computer organization chart. As shown, the computer consists of eight building blocks: 1 — Arithmetic Section, 2 — Memory, 3 — Display Section, 4 — Programs (stored subroutines), 5 — $A_1A_0$ Address Generator, 6 — Data Entry Circuit, 7 — Timing Generator, and 8 — Program Controller.

The Arithmetic Section 1, coupled with the memory 2, performs all basic operations, the subroutines of addition, multiplication, division, complementing, shift-up, shift-down, transfer, count, etc. The Display Section 3 displays all information appearing on communication buss at given time with multiplexing accomplished by $A_1A_0$ address being cycled.

Programs (subroutines) 4 provides not only information of what function is to be performed but generates all address information, buss bias for certain conditions and necessary controls. It also establishes the sequence for $A_1A_0$ Address Generator 5 which is used to produce proper sequence as required by subroutines.

Data Entry Circuits 6 are used to load the memory with initial information. These circuits translate decimal digits to BCD (binary coded decimal) numbers and store them in the assigned memory locations as designated by L, t or f. This includes an instructi0n for decimal point location as well as a clear entry instruction and the start of operation instruction SR.

All timing information: basic clock, cycle clock, $T_1$ and $T_2$ time periods as well as $A_1A_0$ initial address cycling are generated by the Timing Generator 7.

Program Controller 8 makes basic decisions when given subroutine is finished and gives advance pulse for next subroutine until stop subroutine is reached at which time the display subroutine is used to display final result.

PRINCIPLE OF OPERATION

Arithmetic Section Elements

As mentioned previously all operations are performed by the Arithmetic Section 1 with Memory 2 being used as storage. As shown in FIG. 5, the output from Arithmetic Section is fed directly to the memory and a conventional use of accumulator (consisting usually of parallel-in, parallel-out shift registers) was eliminated.

The operation is explained by detail block diagram shown in FIG. 6. The diagram shows the connection between the output of Memory by a way of communications buss to the input of Arithmetic Section. Then the output of the Arithmetic Section, consisting of four wires, is connected to the input of the Memory. In addition shown there are a series of addresses and controls with information being provided by other sections.

Referring to arithmetic section alone, in FIG. 6 it is observed that it consists of seven separate smaller blocks: three 4-bit full adders numbered 9, 11 and 12; one preaccumulator block 10; one inverter 13; one invert/non-invert gate block 14 and carry storage flip-flop 15 with AND function at its D (data) input.

The four bit full adder circuits are presently commercial items and as a reference the SN74283, a TTL (transistor-transistor-logic) type, is a good example. Complete specification for these elements may be found in a book entitled: "The TTL Data Book for Design Engineers" 1973, Texas Instruments Incorporated, P.O. Box 5012, Dallas, TX, as well as in "Supplement to The TTL Data Book for Design Engineers" 1974 by the same publisher.

The full adder mentioned above performs additions of two four bit binary numbers giving resultant sum in a form of four binary bits and also a carry ($C_{OUT}$). It also has a provision for carry-in ($C_0$) which may be a carry-over from previous lower order additions.

The preaccumulator circuit 10 is also a commercial item, type SN7495, with complete detail specification to be found in referred to above books. Basically, it consists of four parallel-in, parallel-out shift registers with data being clocked-in by negative edge trigger type signal. This element is used here as temporary storage.

The inverter, circuit 13, commercial type designation SN7404, basically inverts the input signal from one level to its opposite level.

Invert/non-invert gates, circuit 14, are commercially available type SN74H87, inverts the data signal if its control input is '0' (low) and sends through non-inverted signal when its control input is '1' (high).

The flip-flop, circuit 15 has commercial number SN7474. It is referred to as a D-type flip-flop with information being stored by positive going clock pulse. The circuit is being used here as temporary storage for carry for subsequent higher order additions. Due to the fact that this type has only one D input an AND gate type SN7408 is used. Also, the trigger input as supplied by $T_2$ time interval is inverted by inverter type SN7404.

Referring to memory 2, there is a need for 128 bits of storage capacity. Commercial type SN7489 has a capacity of 64 bits therefore two such elements must be used. Blocks numbered 17 and 18 represent the equivalent combination of the two SN7489's. The output control gates, block 19, were added by using a type SN7403, which is a quadruple 2-input NAND gate with open collector output. The desired function is obtained by wiring one input of all four gates to RE (read enable) control input. The output devices are biased off by applying a "0" (low) and they are biased according to memory outputs: $2^0, 2^1, 2^2, 2^3$, by applying a "1" (high) at RE input. Data input to memory is clocked in by WE (write enable) control input applied to the gates, 16, as provided by SN7489. The information is clocked into the memory with negative type pulse, hence the designation WE.

It should be pointed out that commercial items referred to above serve as examples and do not limit the microcomputer to their use. In fact, any other type of components having similar logical function may be employed.

ARITHMETIC OPERATIONS

Since the BCD number has only 10 combinations out of possible 16 total, it is necessary to translate or correct the resultant sum of addition of two such numbers. The final result must be in a proper BCD form. For this reason, following procedure for additions was adopted:

1. Add binary six to BCD number using 4-bit full adder circuit 9.
2. Store the sum in preaccumulator, circuit 10 at the end of $T_1$ time interval.
3. Add another BCD number, at $T_2$, by a way of circuit 14, using another 4-bit full adder, circuit 11.
4. Correct the resultant sum by the following rule:

A. If the carry out ($C_{out}$) is "0" (zero), then the "sum" has an excess of binary six which is to be deducted by using still another 4-bit fuller adder, circuit 12. The procedure for deduction is as follows: using an inverter, invert "0" to "1" and wire in as a complement of 6 (16th complement) to the appropriate inputs of circuit 12 and add to the existing "sum."

B. If the carry out ($C_{OUT}$) is "1" (one), then the "sum" is in proper BCD form and no correction is required. Therefore, using inverter add "0" to the "sum" by using the same circuit 12.

The correct sum is clocked into the memory at the end of time period $T_2$. Also, the carry out is stored in flip-flop circuit 15 at the end of $T_2$. The carry will be used for next higher order additions.

It should be noted that the invert/non-invert gates pass on a normal non-inverted signal for the case of addition as well as for most subroutines, except for subtraction when a complement is required in which case invert/non-invert gates are used in the process of inverting BCD number in generating a complement. Basically, the subtraction is obtained by adding a complement of a given BCD number.

From the description above, it is observed that the arithmetic section is tailored for additions only. The subroutines requiring other functions must rely on buss bias generation by Section 4 at appropriate times. It is also observed that there are two time intervals involved: $T_1$ and $T_2$. The overall procedure requires two steps:

1. At $T_1$ the information is passed on to arithmetic section preaccumulator, circuit 10.
2. At $T_2$ the information is passed through the rest of section 1 to the inputs of memory and is stored there.

This procedure is followed no matter what type of subroutine is performed.

EXAMPLE OF ADDITION

In order to understand better the process involved in additions, it may be advisable to follow a simple example:

Assume that there are two numbers to be added: 3 (decimal) and 4 (decimal). In BCD form the numbers are:
3 = 0011
4 = 0100

Also assume that the number 0011 (3) is stored in memory location as designated by memory address:

$A_4A_3A_2A_1A_0 = 00100$ where:
$A_0 = 0$
$A_1 = 0$
$A_2 = 1$
$A_3 = 0$
$A_4 = 0$ And assume that the number 0100 (4) is stored in memory location: $A_4A_3A_2A_1A_0 = 11000$.

The resultant sum is to be put back into the memory location: $A_4A_3A_2A_1A_0 = 11000$.

Time intervals $T_1$ and $T_2$ are generated by the timing generator 7.

1. At $T_1$ time interval ($T_1 = 1, T_2 = 0$):

The memory address as generated by 4 — Programs and 5 — Generator is: $A_0 = 0, A_1 = 0, A_2 = 1, A_3 = 0, A_4 = 0$.

Memory controls, also generated by 4—Programs, is WE = 1 (High, which prevents writing into the memory) and RE = 1 (High, which allows the memory to be read out).

The buss lines $B_3B_2B_1B_0$ are to receive the information from the memory and therefore no bias is to be applied by 4—Programs.

It is observed that with given conditions, the information as it appears on buss lines from memory, 0011 (3), is passed on into the circuit 9 of the arithmetic section. Here the binary 0110 (6) is added with the resultant sum:

| 3 | = | 0011 |
|---|---|------|
| +6 | = | 0110 |
| 9 | = | 1001 |

This partial sum, 1001 (9), is stored in preaccumulator, circuit 10, at the end of the time interval $T_1$.

Note that Invert/Non-invert gates were not involved at $T_1$ time and also there is no need to concern with carry control or $C_{OUT}$ output at this time and therefore they may be marked x = don't care.

2. At $T_2$ time interval ($T_1 = 0, T_2 = 1$):

At this time the memory address as generated by 4 and 5 is: $A_4A_3A_2A_1A_0 = 11000$.

Memory controls as generated by 4 are: WE= (Low, allowing to write), RE = 1.

Buss lines are left open to allow reading from memory.

The input to invert/non-invert gates 14 is also generated by 4-Programs and it must be high (1) in order to pass on the information unaltered to circuit 11 for additions. The carry storage control is also supplied by 4 and it is high (1) allowing the carry, if any, to appear at the D-input to flip-flop 15.

Hence, with given conditions, it is observed that for memory address $A_4A_3A_2A_1A_0 = 11000$ a binary number 0100 (4) appears on buss lines. The passage through circuits 9 and 10 is blocked due to $T_1=0$. The number is allowed to pass through invert-non-invert gates unaltered to the inputs of circuit 11, where the addition takes place.

The two numbers, partial sum stored in circuit 10 and new input, passing through circuit 14 is added in circuit 11:

```
   9    -    1001
  +4         +0100
  13    =    1101
```

It is noted that in above addition, there is no carry and therefore the "sum" must be corrected by subtracting six in circuit 12.

Since $C_{OUT} = 0$, inverter 13 gives output = 1. This "1" is applied to two places in circuit 12 to appear as a 16th complement of binary six which is binary ten:

```
  13    =    1101
 +10    =   +1010
  23    =   10111
```

By using only the first 4 binary digits and discarding carry in circuit 12, the result is:

```
  23    =    10111
 -16    =   -10000
   7    =     0111
```

It is observed that $3+4=7$, hence 0111 (7) is correct result.

Due to $\overline{WE} = 0$, the resultant sum is stored or written into the memory at the end of time interval $T_2$. Also, at the end of $T_2$, the carry is clocked into flip-flop 15. However, since the carry was zero in this example, therefore "0" is clocked in.

The described addition operation may be represented in a table form shown below:

| MEMORY ADDRESS | MEMORY CONTROLS | | BUSS BIAS | ARITHMETIC CONTROLS | | | INTERVALS | |
|---|---|---|---|---|---|---|---|---|
| $A_4A_3A_2A_1A_0$ | $\overline{WE}$ | RE | $B_3B_2B_1B_0$ | I/NI | CARRY | $C_{OUT}$ | $T_1$ | $T_2$ |
| 0 0 1 0 0 | 1 | 1 | ——— | x | x | x | 1 | 0 |
| 1 1 0 0 0 | 0 | 1 | ——— | 1 | 1 | x | 0 | 1 |

This is the notation that is being used in describing and performing subroutines.

DISPLAY SECTION

Parts

Display section 3 is shown in detail in FIG. 7. This section consists of three logical circuits: 20, 21 and 22; and four display elements: 23, 24, 25 and 26.

Figure 10:
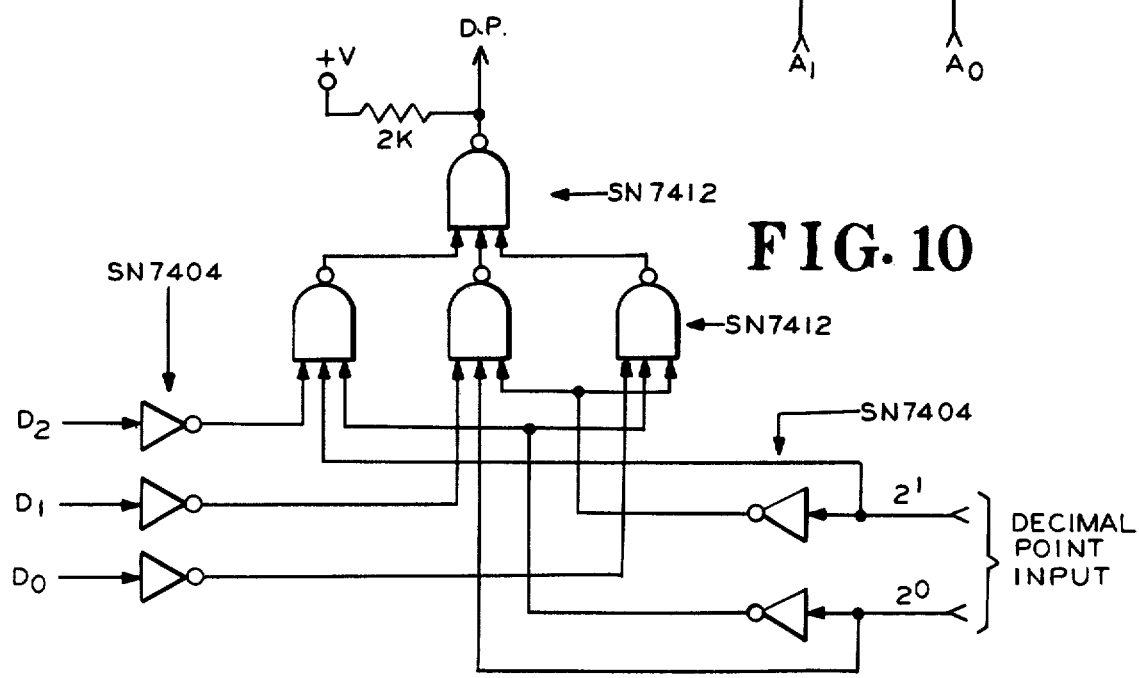
FIG. 10 is a diagram of the decimal point logic circuit.

The logical circuit 20 is commercial type SN74248 (Texas Instruments). The 1/4 decoder with on/off display control, circuit 21, is constructed using standard types: SN7440 and SN7404 as shown in FIG. 10. The decimal point logic, circuit 22, is also made from standard elements SN7412 and SN7404 as shown in FIG. 11.

The seven segment display elements are commercial items. The four parts 23 through 26 may be individual, for example MAN-3M type, by Monsanto Display Products, 3400 Hillview Ave., Palo Alto, Calif. 94304 or the elements may be in one section as in the case of DL-34M, by Litronix, 19000 Homestead Road, Calif. 95014.

It should be pointed out that the above parts are given by a way of example and do not limit the microcomputer to their use.

DISPLAY OPERATION

Circuit 20 converts the BCD number appearing on buss lines into seven segments for display. In multiplexing scheme, commonly used, like segments are connected together and the multiplexing is done by cycling digit drives.

The digit drive information is obtained from memory address $A_1A_0$ is decoded into four outputs by 1/4 decoder circuit 21. Only one output is low at a given time. Therefore only one decimal digit is displayed at a time. However, due to the fact that $A_1A_0$ are cycled rapidly, all four decimal digits appear to be displayed simultaneously to the "naked" eye.

The display on/off control coming from Data Entry Circuits, block 6, control the display on with input being "1" (High) or off with this input being "0" (Low).

The decimal point information appears here from Data Entry Circuits also, and is being used primarily during the time of loading the memory. Final display of result is in a standard form with decimal point at extreme right or Do position.

The readout of the memory directly without the use of conventional shift registers as intermediaries saves the cost of the extra parts and also provides the flexibility of direct visual access to any part of the memory. Also, the method of direct readout eliminates the necessity of transferring the information from memory to the readout and display section. Only memory address is selected for desired location to be displayed.

The table below DISPLAY SUBROUTINE FOR 0000 RAM LOCATIONS shows actually the display of four decimal digits stored in memory locations 00000 through 00011 with 00000 being used here by a way of notation. It is observed that location 00000 is part of the group with the least significant digit being stored there.

| DISPLAY SUBROUTINE FOR 00000 RAM SECTION | | | | | | | | | | | |
|---|---|---|---|---|---|---|---|---|---|---|---|
| Memory Address | | | | | Memory Controls | | Buss Bias | Arithmetic Controls | | Intervals | |
| $A_4$ | $A_3$ | $A_2$ | $A_1$ | $A_0$ | $\overline{WE}$ | RE | $B_3B_2B_1B_0$ | I/NI | CARRY $C_{OUT}$ | $T_1$ | $T_2$ |
| 0 | 0 | 0 | 1 | 1 | 1 | 1 | — | 1 | x   x | 1 | 0 |
| 0 | 0 | 0 | 1 | 1 | 1 | 1 | — | 1 | x   x | 0 | 1 |
| 0 | 0 | 0 | 1 | 0 | 1 | 1 | — | 1 | x   x | 1 | 0 |
| 0 | 0 | 0 | 1 | 0 | 1 | 1 | — | 1 | x   x | 0 | 1 |
| 0 | 0 | 0 | 0 | 1 | 1 | 1 | — | 1 | x   x | 1 | 0 |
| 0 | 0 | 0 | 0 | 1 | 1 | 1 | — | 1 | x   x | 0 | 1 |
| 0 | 0 | 0 | 0 | 0 | 1 | 1 | — | 1 | x   x | 1 | 0 |
| 0 | 0 | 0 | 0 | 0 | 1 | 1 | — | 1 | x   x | 0 | 1 |

Note: 1. x = irrelevant (any input including transitions).
2. — = no bias on buss lines except for RAM output.
DISPLAY OPTIONS: Leading Zero Suppression for first and second positions.

| DATA ENTRY SUBROUTINE FOR 00000 RAM SECTION | | | | | | | | | | | | | | | |
|---|---|---|---|---|---|---|---|---|---|---|---|---|---|---|---|
| 0 | 0 | 0 | 1 | 0 | 1 | 1 | — | — | — | — | 1 | x | x | 1 | 0 | ($N_3$) |
| 0 | 0 | 0 | 1 | 1 | 0 | x | 0 | 0 | 0 | 0 | 1 | x | x | 0 | 1 |
| 0 | 0 | 0 | 0 | 1 | 1 | 1 | — | — | — | — | 1 | x | x | 1 | 0 | ($N_3$) |
| 0 | 0 | 0 | 1 | 0 | 0 | x | 0 | 0 | 0 | 0 | 1 | x | x | 0 | 1 |
| 0 | 0 | 0 | 0 | 0 | 1 | 1 | — | — | — | — | 1 | x | x | 1 | 0 | ($N_3$) |
| 0 | 0 | 0 | 0 | 1 | 0 | x | 0 | 0 | 0 | 0 | 1 | x | x | 0 | 1 |
| x | x | x | x | x | 1 | 0 | — | — | — | — | 1 | x | x | 1 | 0 | (Enter BCD) |
| 0 | 0 | 0 | 0 | 0 | 0 | x | 0 | 0 | 0 | 0 | 1 | x | x | 0 | 1 |

$N_3$: For first digit the buss lines must have zero bias in order to clear the Memory, $B_3B_2B_1B_0 = 0000$.

From the above, it is noted that except for time intervals coming from the timing generator the only change appears in the $A_1A_0$ address being cycled. $\overline{WE}$ memory control is kept at "1" (high) to prevent writing erroneously into the memory during the display cycle. The $A_1A_0$ address is being cycled by a way of sequence Address Generator, 5, with sequence provided by 4—Programs. The sequence of starting with $A_1 = 1$ and $A_0 = 1$, and cycling down to $A_1 = 0$, $A_0 = 0$, is for the purpose of deleting leading decimal zero's in the display.

PROGRAMS

This section is shown in detail block form in FIG. 8. It is observed that it consists of 10 logical circuit blocks, circuits 27 through 36.

Circuits 27, 28, 29, 30 are commercial type SN7450. These circuits are select switches and are used by $T_1$ and $T_2$ time intervals to select proper addresses and controls applicable to each period.

Circuit block 33 consists of ROM output override logical functions and they are obtained by wiring commercial types as shown in FIG. 8. The types are standard TTL gates.

Circuit block 34 and 35 constitute a ROM (read only memory). These circuits, in order for the micro-computer design to be reduced to practice were wired using commercially available NAND (Not AND) TTL gates. Detail specification for these circuits, as was already mentioned previously, may be found in the referred books. The organization and logical functions generated by these gates, however, are equivalent to the diagram as shown in FIG. 8.

Circuit block 36, a program counter, was constructed using five (5) commercial type TTL D Flip-Flops SN7474.

Here again, it is pointed out, the types mentioned are given by a way of example and they do not limit microcomputer to their use.

PROGRAMS OPERATIONS

Circuit blocks 34 and 35 form the base of detail instruction generating station. All addresses and controls are stored there in fixed form and are supplied to the outputs for a given subroutine program.

The program is selected by circuit 35 by decoding the outputs of a program counter, circuit 36, which has a minimum count of 00000 (0) and a maximum count of 11111 (31) for a total capacity of 32 subroutine programs. Since only 28 programs were needed, the last four outputs from decoder were wired as STOP.

The given program, as decoded by 1/32 decoder, then determines all outputs of circuit block 34 applicable to this subroutine. These outputs may be either addresses or control signals. As it is shown in FIG. 8, the outputs may be divided into eight (8) groups, which are marked as a, b, c, d, e, f, and g.

Group a generates memory RAM addresses $A_4A_3A_2$ for $T_1$ time interval and also $A_4A_3A_2$ address for $T_2$ interval for a total of six outputs. These addresses are later selected by circuit block 27 switches, that are controlled by $T_1$ and $T_2$, so as to obtain only three outputs applicable to respected intervals.

Group b generates control signals which in turn determine the sequence of $A_1A_0$ generation by address generator 5 since each subroutine has a prescribed order of $A_1$ and $A_0$ variation.

Group c generates memory controls: $\overline{WE}$ (write enable) and RE (read enable). These signals are also given for both $T_1$ and $T_2$ periods simultaneously and are later selected by switches in circuits 28 and 29.

Group d generates communications buss bias conditions for both $T_1$ and $T_2$ periods, a total of eight "ROM" outputs that are further selected into four outputs at given time interval by switches 30. These outputs may be in any one of the three states, so calld "tri-state": low (0), high (1) or High z (floating).

Group e generates control levels for Invert-Non-Invert gates in Arithmetic Section 1 as required by given subroutine program. This output is normally high (1) except for the case of complementing when it is low (0).

Group f generates carry storage control for Flip-Flop #15 in Arithmetic Section. This output control is referred to as "carry" for the simplicity of notation.

Group g generates the number of cycles that must be performed in a given subroutine. Minimum cycles is one and maximum is four. Four separate decoded outputs are generated simultaneously, however, only one output (depending upon the number of cycles) is high.

Group f generates only one output which may be 1 (high) for continuing operation or 0 (low) for stopping.

It is observed that there are some 31 outputs being generated by the ROM block. These outputs may be modified by Override circuits 33 as in the case of Data Entry sub-program or if a subroutine requires several cycles. Study showed that the approach of modifying ROm outputs to be more economical than expanding ROM capacity which otherwise would be required.

ADDRESS GENERATOR

FIG. 8 shows also detail block diagram for the address generator. It is noted that it consists of four basic logical circuits: 37, 38, 39 and 40. The circuit 37 is a commercial type SN7450, which is a "Dual 2 Input AND OR Invert" gates.

Circuit 38 is Invert/Non-Invert gate, commercial type SN74H87.

Circuit 39 is type SN7450, the same as 37 except that ROM control outputs do the selecting instead of $T_1$ or $T_2$ signals.

Circuit 40 is "2 Bit Full Adder, " commercial type SN7482.

It is also noted that the inputs to circuit 38 also come from ROM.

OPERATION: (5)

Each Individual Subroutine requires a certain sequence of $A_1A_0$ address. For example, a transfer operation uses $A_1A_0$ sequence as follows:

|  | $A_1$ | $A_0$ | $T_1$ | $T_2$ |
|---|---|---|---|---|
| Case #1: | 0 | 0 | 1 | 0 |
|  | 0 | 0 | 0 | 1 |
|  | 0 | 1 | 1 | 0 |
|  | 0 | 1 | 0 | 1 |
|  | 1 | 0 | 1 | 0 |
|  | 1 | 0 | 0 | 1 |
|  | 1 | 1 | 1 | 0 |
|  | 1 | 1 | 0 | 1 |

CYCLE

This sequence as it appears is the same as generated by Timing Generator (7) and therefore the input to Invert/Non-Invert circuit 38 is high (1) as generated by ROM in order to pass the signals unaltered. The input to circuit 39 is also high (1) as put out by ROM because the adder is not used.

The display subroutine requires a sequence that is as follows:

|  | $A_1$ | $A_0$ | $T_1$ | $T_2$ |
|---|---|---|---|---|
| Case #2: | 1 | 1 | 1 | 0 |
|  | 1 | 1 | 0 | 1 |
|  | 1 | 0 | 1 | 0 |
|  | 1 | 0 | 0 | 1 |
|  | 0 | 1 | 1 | 0 |
|  | 0 | 1 | 0 | 1 |
|  | 0 | 0 | 1 | 0 |

-continued

|  | $A_1$ | $A_0$ | $T_1$ | $T_2$ |
|---|---|---|---|---|
|  | 0 | 0 | 0 | 1 |

Here the address must be inverted as compared to case 1 above and therefore the input to Invert/Non-Invert gates is low (0), but, the input to circuit 39 is still high (1).

The Shift-Down subroutine required $A_1A_0$ sequence as follows:

|  | $A_1$ | $A_0$ | $T_1$ | $T_2$ |
|---|---|---|---|---|
| Case #3: | 0 | 1 | 1 | 0 |
|  | 0 | 0 | 0 | 1 |
|  | 1 | 0 | 1 | 0 |
|  | 0 | 1 | 0 | 1 |
|  | 1 | 1 | 1 | 0 |
|  | 1 | 0 | 0 | 1 |
|  | 0 | 0 | 1 | 0 |
|  | 1 | 1 | 0 | 1 |

The sequence as it appears has certain order that must be generated precisely by generator 5. For the purposes of analysis, given sequence may be shown separately for $T_1$ interval and also separately for $T_2$ with following respective order:

| $A_1$ | $A_0$ | $T_1$ | $A_1$ | $A_0$ | $T_2$ |
|---|---|---|---|---|---|
| 0 | 1 | 1 | 0 | 0 | 1 |
| 1 | 0 | 1 | 0 | 1 | 1 |
| 1 | 1 | 1 | 1 | 0 | 1 |
| 0 | 0 | 1 | 1 | 1 | 1 |

It is observed that for $T_2$ interval the address is normal, the same as in the case of transfer, however, for $T_1$ interval the address appears to have an extra 1 in it: this 1 may be added to $A_1A_0$ sequence from Timing Generator 7. The addition may be performed by using 2-Bit Full Adder, circuit 40.

The input then from ROM is low (0) to L/R (left/right) switches, circuit 39, so that the output from circuit 40 may be passed through. Since there is no inversion, the input to I/NI circuit 38 is high (1) as it appears from ROM. The switches, circuit 37 eventually select proper sequence for $T_1$ as well as $T_2$ time intervals.

The Shift-Up subroutine sequence is as follows:

|  | $A_1$ | $A_0$ | $T_1$ | $T_2$ |
|---|---|---|---|---|
| Case #4: | 1 | 0 | 1 | 0 |
|  | 1 | 1 | 0 | 1 |
|  | 0 | 1 | 1 | 0 |
|  | 1 | 0 | 0 | 1 |
|  | 0 | 0 | 1 | 0 |
|  | 0 | 1 | 0 | 1 |
|  | 1 | 1 | 1 | 0 |
|  | 0 | 0 | 0 | 1 |

Comparing the sequence of case #4 to the one in case #3, it is noted that the sequence in case #4 is inverted in respect to case #3. For this reason, the input for I/NI gate must be low (0) to cause inversion and the input to L/R switches circuit 39 is the same as in case 3, low (0), to allow the use of output of adder, circuit 40.

The four cases of $A_1A_0$ address sequences mentioned were the only ones required for all subroutines.

With the present scheme only gating is required while in the conventional approach, with up-down counters and skip provision two flip-flops would be needed in addition to gating.

TIMING GENERATOR

Figure 9:
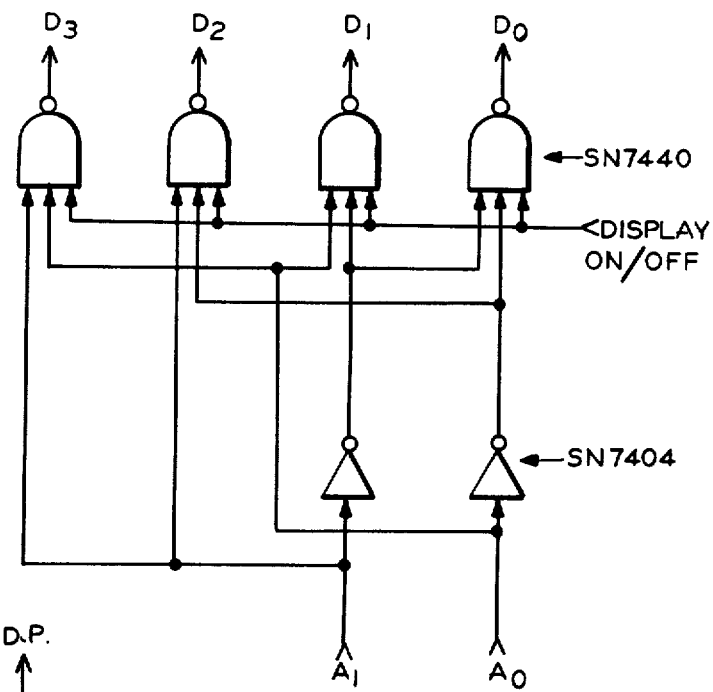
FIG. 9 is a diagram of the decoder with off/on control.

Detail block of this section is shown in FIG. 9 It is noted that the timing generator consists of five logical circuits: 54, 55, 56, 57 and 58.

Circuit 54, the oscillator, is built out of inverters, commercial type SN7406. Circuit 55, as well as 56 and 57 are D-type Flip-Flops SN7474. Circuit 58 is an AND function built out of SN7420 (NAND) and inverter type SN7404.

The oscillator, consisting of three inverters in series and connected back from output to input generates basic clock for microcomputer. The use of this type of oscillator is well known, it is very reliable, because, being unstable, the oscillations will persist under all conditions of variation of voltage or temperature. The period of oscillation is being controlled by an external capacitor.

The oscillator drives first Flip-Flop, circuit 55, which is connected as counter-divider. This circuit generates in turn the two time intervals $T_1$ and $T_2$ which are of equal time duration. The outputs from circuit 55 must be buffered by inverter-buffer type SN7406 in order to drive all sections of the machine.

The output of circuit 55 is also applied as a clock to Flip-Flop 56 which is also connected as counter/divider. This flip-flop is used to generate basic $A_0$ address. Circuit 56 in turn drives Flip-Flop 57 to obtain basic $A_1$ address.

The three Flip-Flop circuits 55, 56 and 57 are AND'ed together with oscillator 54 to generate a cycle clock by circuit 58. This cycle clock is fed into the Program Controller and also to Data Entry Circuitry.

8-PROGRAM CONTROLLER

Program Controller is a part of FIG. 9, where all logical blocks of this section are shown in detail form. It is observed that the controller consists of four logical circuits, numbered 59, 60, 61 and 62.

Circuit 59, a cycle counter, uses two D-type Flip-Flops SN7474. Circuit 60 is a 1/4 (one out of four) decoder as shown in FIG. 10 but without on/off control. Circuit 60 is a logical block using basic type SN7406 with wired "OR" functions to generate set and reset pulses for cycle counter. Circuit 62 is made out of standard SN7400 series TTL gates.

The number of cycles that the subroutine requires are counted by circuit 59 and then decoded in circuit 60. The control for the counter comes from ROM outputs which determine by circuit 61 when the counter is to be reset and new program to begin. The outputs from 60 circuit, the decoder, are used in program advance circuit 62 and also ROM output section to override the signals there for certain subroutines.

Advance program block 62 makes basic decisions when to advance the program. It receives inputs from ROM, cycle counter, $C_{OUT}$ from arithmetic section and timing generator, and it produces an advance pulse to program counter. This pulse is subject to conditions which may be expressed as follows:

Advance program
pulse = $SR(1tf) + E_1S_1 + E_2S_2 + E_3S_2A_1A_0C_{OUT} + E_4S_4C_{OUT}$ Where: SR (1tf) is a term determining the start of the program, only after all variables: f and L and t have been entered.

2. $E_1S_1$ is a term referring to one cycle operation, with $E_1$ signal coming from ROM and $S_1$ from cycle counter.
3. $E_2S_2$ is a term referring to two cycle operation, with $E_2$ coming from ROM and $S_2$ from cycle counter.
4. $E_3S_2A_1A_0C_{OUT}$ is a term defining three cycle operation by $E_3$ from ROM output and in second cycle $S_2$ from cycle counter, with $A_1$ and $A_0$ being 1 (high) from timing generator, there is a carry $C_{OUT} = 1$ (high) from arithmetic section.
5. $E_4S_4C_{OUT}$ is a term defining four cycles by $E_4$ from ROM, being in fourth cycle $S_4$ as determined by cycle counter, there is a carry $C_{OUT} = 1$.

DATA ENTRY CIRCUITS

FIG. 9 shows detail block diagram of Data Entry Circuits. The circuits are standard logical components with complete specification given in the referenced books. They are numbered in FIG. 9 from 37 through 51, a total of fifteen.

Circuit 37 is a Decimal to BCD Encoder, SN74147 with negative NOR gate SN74s133. Circuit 38 is a set of switches, a standard component of hand held calculator. Circuit 39 is a digit counter and it was constructed using three D-type Flip-Flop SN7474. Circuit 40 is 1/8 (one out of eight) decoder SN74S138. Circuit 41 is constructed out of SN7420 and SN7404 gates. Circuit 42 is made out of SN7403 NAND gates and circuit 35 is made out of SN7420 and SN7404. Circuit 44 is a decimal point counter using two SN7474's type. Circuits 45, 46 and 47, as well as 48, are RS Flip-Flops wired from SN7400. Circuit 49 is a negative NOR SN7420 (positive NAND). Circuit block 50 is a combinational logic consisting of standard SN7400 series gates and one SN7474 FLIP-FLOP. Circuit 43 is an RS Flip-Flop wired from SN7410 gates.

ENTERING DATA

Data Entry Circuits employ a special sub-program, consisting of two parts: $N_1$ = program for entering data into temporary storage section of memory and $N_2$ = program for transferring data to designated memory sections.

Referring to note 1 ($N_1$), it is observed that sub-program for entering data consists of eight (8) steps. The sub-program is stored in the data entry section by digit counter, circuit 39, digit decoder 40 and enter/display logic circuit 41. This sub-program is given in terms of the three outputs of the digit counter.

Sub-programs: 000, 010, 100 and 110 are display subroutines according to the display subroutine table.

Sub-programs: 001, 011, 101 and 11 are data entree subroutines. The subroutine consists of shift-up operation and entering BCD number during $A_1 = 0$, $A_0 = 0$, (which is the least significant digit location).

During the first digit entree, sub-program 001, the bus bias has a 0 (low) potential applied in order to clear all digits above the one being entered.

Physical realization of entering data consists of pressing appropriate decimal digit button: 0,1,2,3,4,5,6,7,8,9, which when encoded to BCD number is allowed to pass to the communications buss and by a way of arithmetic section is stored in the memory, 00000 temporary storage section. The subroutine for this operation is defined by the data entry subroutine table.

DECIMAL POINT

A special track is being kept of decimal point during data entry. Basically, the decimal point, with button pressed, is first stored in RS Flip-Flop, circuit 45, and then shifted together with digit entry to proper location as defined by decimal point counter circuit 44. The output of this counter is supplied to the Display Section for display purposes.

MEMORY SECTION LOADING According to the program control, $N_2$, a special two step sub-program is used to transfer the data from 00000 memory section to the predesignated section f, l or t in the memory.

The first step in this sub-program consists of putting the entered number in standard form: XX.XX for the case of f or L and XXX.X for the case of t. Standardization consists of shifting up the number (Data Entry Table) until the decimal point appears in proper location.

The second step is performed according to transfer subroutines shown in Tables, hereinafter, depending upon which button was pressed. This second step also resets the digit counter and decimal point counter as a preparatory step for furture entries.

Record of the t f l loading is kept by the three RS Flip-Flops 46, 47 and 48.

CLEAR ENTRY OPERATION

Last data entry may be cleared by pressing CE (clear entry) button. The internal operations consists of using established procedures as for t f L with zero being entered in memory (no digit buttons were pressed) and resetting digit counter and decimal point counter at the same time to prepare for entering the first number.

DISPLAY CONTROL

The display is initiated by pressing any number or SR and is turned off by pressing f, t or L button. An RS Flip-Flop is used for this purpose to record the last button pressed. The output from this Flip-Flop Circuit 51 is supplied to the display

SR

By pressing SR button, the operation may start if all three t f L variables were entered, at least once, each.

The last entry is recorded. If any one or more of the variables were not recorded and are missing the display shows this:

1 1 1 1 = f is missing
2 2 2 2 = L is missing
3 3 3 3 = t is missing

This display is visible only when SR button is held depressed. In the case of all three f, L and t mising: display shows 1111; for L and t missing: display shows 2222.

With all variables stored, pressing of the SR button will start the operation:

Start = SR (ftL)

The display flickers during the run and comes to fixed number display upon completion.

OVERALL MICROCOMPUTER OPERATIONS

Subroutines

Program 00000: Data is entered using data entry subroutine shown in table form by Data Entry Subroutine combined with Transfer Subroutine for 00100 for f, Transfer Subroutine for 01000 to L, or transfer Subroutine for 10000 for t sections.

| TRANSFER SUBROUTINE FOR 00100 | | | | | | | | | | | | | | |
|---|---|---|---|---|---|---|---|---|---|---|---|---|---|---|
| MEMORY ADDRESS | | | | MEMORY CONTROLS | | BUSS BIAS | | | | ARITHMETIC CONTROLS | | | INTERVALS | |
| $A_4$ | $A_3$ | $A_1$ | $A_0$ | WE | RE | $B_3$ | $B_2$ | $B_1$ | $B_0$ | I/NI | CARRY | $C_{OUT}$ | $T_1$ | $T_2$ |
| 0 | 0 | 0 | 0 | 0 | 1 | 1 | — | — | — | — | 1 | X | X | 1 | 0 |
| 0 | 0 | 1 | 0 | 0 | 0 | X | 0 | 0 | 0 | 0 | 1 | X | X | 0 | 1 |
| 0 | 0 | 0 | 0 | 1 | 1 | 1 | — | — | — | — | 1 | X | X | 1 | 0 |
| 0 | 0 | 1 | 0 | 1 | 0 | X | 0 | 0 | 0 | 0 | 1 | X | X | 0 | 1 |
| 0 | 0 | 0 | 1 | 0 | 1 | 1 | — | — | — | — | 1 | X | X | 1 | 0 |
| 0 | 0 | 1 | 1 | 0 | 0 | X | 0 | 0 | 0 | 0 | 1 | X | X | 0 | 1 |
| 0 | 0 | 0 | 1 | 1 | 1 | 1 | — | — | — | — | 1 | X | X | 1 | 0 |
| 0 | 0 | 1 | 1 | 1 | 0 | X | 0 | 0 | 0 | 0 | 1 | X | X | 0 | 1 |

| TRANSFER SUBROUTINE FOR 01000 | | | | | | | | | | | | | | |
|---|---|---|---|---|---|---|---|---|---|---|---|---|---|---|
| 0 | 0 | 0 | 0 | 0 | 1 | 1 | — | — | — | — | 1 | X | X | 1 | 0 |
| 0 | 1 | 0 | 0 | 0 | 0 | X | 0 | 0 | 0 | 0 | 1 | X | X | 0 | 1 |
| 0 | 0 | 0 | 0 | 1 | 1 | 1 | — | — | — | — | 1 | X | X | 1 | 0 |
| 0 | 1 | 0 | 0 | 1 | 0 | X | 0 | 0 | 0 | 0 | 1 | X | X | 0 | 1 |
| 0 | 0 | 0 | 1 | 0 | 1 | 1 | — | — | — | — | 1 | X | X | 1 | 0 |
| 0 | 1 | 0 | 1 | 0 | 0 | X | 0 | 0 | 0 | 0 | 1 | X | X | 0 | 1 |
| 0 | 0 | 0 | 1 | 1 | 1 | 1 | — | — | — | — | 1 | X | X | 1 | 0 |
| 0 | 1 | 0 | 1 | 1 | 0 | X | 0 | 0 | 0 | 0 | 1 | X | X | 0 | 1 |

| TRANSFER SUBROUTINE FOR 10000 | | | | | | | | | | | | | | |
|---|---|---|---|---|---|---|---|---|---|---|---|---|---|---|
| 0 | 0 | 0 | 0 | 0 | 1 | 1 | — | — | — | — | 1 | X | X | 1 | 0 |
| 1 | 0 | 0 | 0 | 0 | 0 | X | 0 | 0 | 0 | 0 | 1 | X | X | 0 | 1 |
| 0 | 0 | 0 | 0 | 1 | 1 | 1 | — | — | — | — | 1 | X | X | 1 | 0 |
| 1 | 0 | 0 | 0 | 1 | 0 | X | 0 | 0 | 0 | 0 | 1 | X | X | 0 | 1 |
| 0 | 0 | 0 | 1 | 0 | 1 | 1 | — | — | — | — | 1 | X | X | 1 | 0 |
| 1 | 0 | 0 | 1 | 0 | 0 | X | 0 | 0 | 0 | 0 | 1 | X | X | 0 | 1 |
| 0 | 0 | 0 | 1 | 1 | 1 | 1 | — | — | — | — | 1 | X | X | 1 | 0 |
| 1 | 0 | 0 | 1 | 1 | o | X | 0 | 0 | 0 | 0 | 1 | X | X | 0 | 1 |

Program 00001: Clear Subroutine, for 10000, one cycle operation.

| CLEAR SUBROUTINE FOR 00000 | | | | | | | | | | | | | | |
|---|---|---|---|---|---|---|---|---|---|---|---|---|---|---|
| MEMORY ADDRESS | | | | MEMORY CONTROLS | | BUSS BIAS | | | | ARITHMETIC CONTROLS | | | INTERVALS | |
| $A_4$ | $A_3$ | $A_2$ | $A_1$ | $A_0$ | WE | RE | $B_3$ | $B_2$ | $B_1$ | $B_0$ | I/NI | CARRY | $C_{OUT}$ | $T_1$ | $T_2$ |
| 0 | 0 | 0 | 0 | 0 | X | X | 0 | 0 | 0 | 0 | 1 | X | X | 1 | 0 |
| 0 | 0 | 0 | 0 | 0 | 0 | X | 0 | 0 | 0 | 0 | 1 | X | X | 0 | 1 |
| 0 | 0 | 0 | 0 | 1 | X | X | 0 | 0 | 0 | 0 | 1 | X | X | 1 | 0 |
| 0 | 0 | 0 | 0 | 1 | 0 | X | 0 | 0 | 0 | 0 | 1 | X | X | 0 | 1 |
| 0 | 0 | 0 | 1 | 0 | X | X | 0 | 0 | 0 | 0 | 1 | X | X | 1 | 0 |
| 0 | 0 | 0 | 1 | 0 | 0 | X | 0 | 0 | 0 | 0 | 1 | X | X | 0 | 1 |

| MEMORY ADDRESS | | | | | MEMORY CONTROLS | | BUSS BIAS | | | | ARITHMETIC CONTROLS | | | INTERVALS | |
|---|---|---|---|---|---|---|---|---|---|---|---|---|---|---|---|
| A4 | A3 | A2 | A1 | A0 | WE | RE | B3 | B2 | B1 | B0 | I/NI | CARRY | $C_{OUT}$ | T1 | T2 |
| 0 | 0 | 0 | 1 | 1 | X | X | 0 | 0 | 0 | 0 | 1 | X | X | 1 | 0 |
| 0 | 0 | 0 | 1 | 1 | 0 | X | 0 | 0 | 0 | 0 | 1 | X | X | 0 | 1 |

CLEAR SUBROUTINE FOR 00000 (-continued)

Program 00010: Clear subroutine, two cycle operation.

| MEMORY ADDRESS | | | | | MEMORY CONTROLS | | BUSS BIAS | | | | ARITHMETIC CONTROLS | | | INTERVALS | |
|---|---|---|---|---|---|---|---|---|---|---|---|---|---|---|---|
| A4 | A3 | A2 | A1 | A0 | WE | RE | B3 | B2 | B1 | B0 | I/NI | CARRY | $C_{OUT}$ | T1 | T2 |
| 1 | 1 | 0 | 0 | 0 | X | X | 0 | 0 | 0 | 0 | 1 | X | X | 1 | 0 |
| 1 | 1 | 0 | 0 | 0 | 0 | X | 0 | 0 | 0 | 0 | 1 | X | X | 0 | 1 |
| 1 | 1 | 0 | 0 | 1 | X | X | 0 | 0 | 0 | 0 | 1 | X | X | 1 | 0 |
| 1 | 1 | 0 | 0 | 1 | 0 | X | 0 | 0 | 0 | 0 | 1 | X | X | 0 | 1 |
| 1 | 1 | 0 | 1 | 0 | X | X | 0 | 0 | 0 | 0 | 1 | X | X | 1 | 0 |
| 1 | 1 | 0 | 1 | 0 | 0 | X | 0 | 0 | 0 | 0 | 1 | X | X | 0 | 1 |
| 1 | 1 | 0 | 1 | 1 | X | X | 0 | 0 | 0 | 0 | 1 | X | X | 1 | 0 |
| 1 | 1 | 0 | 1 | 1 | 0 | X | 0 | 0 | 0 | 0 | 1 | X | X | 0 | 1 |
| 1 | 1 | 1 | 0 | 0 | X | X | 0 | 0 | 0 | 0 | 1 | X | X | 1 | 0 |
| 1 | 1 | 1 | 0 | 0 | 0 | X | 0 | 0 | 0 | 0 | 1 | X | X | 0 | 1 |
| 1 | 1 | 1 | 0 | 1 | X | X | 0 | 0 | 0 | 0 | 1 | X | X | 1 | 0 |
| 1 | 1 | 1 | 0 | 1 | 0 | X | 0 | 0 | 0 | 0 | 1 | X | X | 0 | 1 |
| 1 | 1 | 1 | 1 | 0 | X | X | 0 | 0 | 0 | 0 | 1 | X | X | 1 | 0 |
| 1 | 1 | 1 | 1 | 0 | 0 | X | 0 | 0 | 0 | 0 | 1 | X | X | 0 | 1 |
| 1 | 1 | 1 | 1 | 1 | X | X | 0 | 0 | 0 | 0 | 1 | X | X | 1 | 0 |
| 1 | 1 | 1 | 1 | 1 | 0 | X | 0 | 0 | 0 | 0 | 1 | X | X | 0 | 1 |

CLEAR SUBROUTINE FOR 11000 & 11100

Program 00011: Multiplication subroutine as shown below. This subroutine consists of four cycles, repetitive. The repetition is conditional. When a carry-out $C_{OUT}=1$ is obtained during the fourth cycle, then the multiplication is completed and the program is advanced to next subroutine.

| MEMORY ADDRESS | | | | | MEMORY CONTROLS | | BUSS BIAS | | | | ARITHMETIC CONTROLS | | | INTERVALS | |
|---|---|---|---|---|---|---|---|---|---|---|---|---|---|---|---|
| A4 | A3 | A2 | A1 | A0 | WE | RE | B3 | B2 | B1 | B0 | I/NI | CARRY | $C_{OUT}$ | T1 | T2 |
| 0 | 0 | 1 | 0 | 0 | 1 | 1 | — | — | — | — | 1 | x | x | 1 | 0 |
| 1 | 1 | 0 | 0 | 0 | 0 | 1 | — | — | — | — | 1 | 1 | x | 0 | 1 |
| 0 | 0 | 1 | 0 | 1 | 1 | 1 | — | — | — | — | 1 | x | x | 1 | 0 |
| 1 | 1 | 0 | 0 | 1 | 0 | 1 | — | — | — | — | 1 | 1 | x | 0 | 1 |
| 0 | 0 | 1 | 1 | 0 | 1 | 1 | — | — | — | — | 1 | x | x | 1 | 0 |
| 1 | 1 | 0 | 1 | 0 | 0 | 1 | — | — | — | — | 1 | 1 | x | 0 | 1 |
| 0 | 0 | 1 | 1 | 1 | 1 | 1 | — | — | — | — | 1 | x | x | 1 | 0 |
| 1 | 1 | 0 | 1 | 1 | 0 | 1 | — | — | — | — | 1 | 1 | x | 0 | 1 |
| 1 | 1 | 1 | 0 | 0 | 1 | 1 | — | — | — | — | 1 | x | x | 1 | 0 |
| 1 | 1 | 1 | 0 | 0 | 0 | x | 0 | 0 | 0 | 0 | 1 | 1 | x | 0 | 1 |
| 1 | 1 | 1 | 0 | 1 | 1 | 1 | — | — | — | — | 1 | x | x | 1 | 0 |
| 1 | 1 | 1 | 0 | 1 | 0 | x | 0 | 0 | 0 | 0 | 1 | 1 | x | 0 | 1 |
| 1 | 1 | 1 | 1 | 0 | 1 | 1 | — | — | — | — | 1 | x | x | 1 | 0 |
| 1 | 1 | 1 | 1 | 0 | 0 | x | 0 | 0 | 0 | 0 | 1 | 1 | x | 0 | 1 |
| 1 | 1 | 1 | 1 | 1 | 1 | 1 | — | — | — | — | 1 | x | x | 1 | 0 |
| 1 | 1 | 1 | 1 | 1 | 0 | x | 0 | 0 | 0 | 0 | 1 | 1 | x | 0 | 1 |
| 0 | 0 | 0 | 0 | 0 | 1 | 1 | — | — | — | — | 1 | x | x | 1 | 0 |
| 0 | 0 | 0 | 0 | 0 | 0 | 0 | — | — | — | — | 1 | 1 | x | 0 | 1 |
| 0 | 0 | 0 | 0 | 1 | 1 | 1 | — | — | — | — | 1 | x | x | 1 | 0 |
| 0 | 0 | 0 | 0 | 1 | 0 | x | 0 | 0 | 0 | 0 | 1 | 1 | x | 0 | 1 |
| 0 | 0 | 0 | 1 | 0 | 1 | 1 | — | — | — | — | 1 | x | x | 1 | 0 |
| 0 | 0 | 0 | 1 | 0 | 0 | x | 0 | 0 | 0 | 0 | 1 | 1 | x | 0 | 1 |
| 0 | 0 | 0 | 1 | 1 | 1 | 1 | — | — | — | — | 1 | x | x | 1 | 0 |
| 0 | 0 | 0 | 1 | 1 | 0 | x | 0 | 0 | 0 | 0 | 1 | 1 | x | 0 | 1 |
| 0 | 0 | 0 | 1 | 1 | 1 | x | x | x | x | x | 1 | x | x | 1 | 0 |
| 0 | 0 | 0 | 1 | 1 | 1 | x | x | x | x | x | 1 | x | x | 0 | 1 |
| 0 | 0 | 0 | 1 | 0 | 1 | x | x | x | x | x | 1 | x | x | 1 | 0 |
| 0 | 0 | 0 | 0 | 1 | 1 | x | x | x | x | x | 1 | x | x | 0 | 1 |
| 0 | 0 | 0 | 0 | 1 | 1 | 1 | 0 | x | 0 | 0 | 1 | x | x | 1 | 0 |
| 0 | 0 | 0 | 0 | 0 | 1 | 1 | — | — | — | — | 1 | x | x | 1 | 0 |
| 0 | 0 | 0 | 0 | 0 | 1 | 0 | 0 | 1 | 0 | 0 | 1 | 0 | (1) | 0 | 1 |

MULTIPLICATION SUBROUTINE FOR 00100, 11000 & 11100

Program 00100: Shift-up by two cycles.

| MEMORY ADDRESS | | | | | MEMORY CONTROLS | | BUSS BIAS | | | | ARITHMETIC CONTROLS | | | INTERVAL | |
|---|---|---|---|---|---|---|---|---|---|---|---|---|---|---|---|
| A4 | A3 | A2 | A1 | A0 | WE | RE | B3 | B2 | B1 | B0 | I/NI | CARRY | $C_{OUT}$ | T1 | T2 |
| 1 | 1 | 1 | 1 | 0 | 1 | 1 | — | — | — | — | 1 | X | X | 1 | 0 |
| 1 | 1 | 1 | 1 | 1 | 0 | 1 | 0 | 0 | 0 | 0 | 1 | X | X | 0 | 1 |
| 1 | 1 | 1 | 0 | 1 | 1 | 1 | — | — | — | — | 1 | X | X | 1 | 0 |
| 1 | 1 | 1 | 1 | 0 | 0 | 1 | 0 | 0 | 0 | 0 | 1 | X | X | 0 | 1 |
| 1 | 1 | 1 | 0 | 0 | 1 | 1 | — | — | — | — | 1 | X | X | 1 | 0 |
| 1 | 1 | 1 | 0 | 1 | 0 | 1 | 0 | 0 | 0 | 0 | 1 | X | X | 0 | 1 |
| 1 | 1 | 0 | 1 | 1 | 1 | 1 | — | — | — | — | 1 | X | X | 1 | 0 |

SHIFT-UP SUBROUTINE FOR 11000 & 11100

SHIFT-UP SUBROUTINE FOR 11000 & 11100

| MEMORY ADDRESS | | | | | MEMORY CONTROLS | | BUSS BIAS | | | | ARITHMETIC CONTROLS | | | INTERVAL | |
|---|---|---|---|---|---|---|---|---|---|---|---|---|---|---|---|
| A4 | A3 | A2 | A1 | A0 | WE | RE | B3 | B2 | B1 | B0 | I/NI | CARRY | $C_{OUT}$ | $T_1$ | $T_2$ |
| 1 | 1 | 1 | 0 | 0 | 0 | 1 | 0 | 0 | 0 | 0 | 1 | X | X | 0 | 1 |
| 1 | 1 | 0 | 1 | 0 | 1 | 1 | — | — | — | — | 1 | X | X | 1 | 0 |
| 1 | 1 | 0 | 1 | 1 | 0 | 1 | 0 | 0 | 0 | 0 | 1 | X | X | 0 | 1 |
| 1 | 1 | 0 | 0 | 1 | 1 | 1 | — | — | — | — | 1 | X | X | 1 | 0 |
| 1 | 1 | 0 | 1 | 0 | 0 | 1 | 0 | 0 | 0 | 0 | 1 | X | X | 0 | 1 |
| 1 | 1 | 0 | 0 | 0 | 1 | 1 | — | — | — | — | 1 | X | X | 1 | 0 |
| 1 | 1 | 0 | 0 | 1 | 0 | 1 | 0 | 0 | 0 | 0 | 1 | X | X | 0 | 1 |
| 1 | 1 | X | 1 | 1 | 1 | 1 | 0 | 0 | 0 | 0 | 1 | X | X | 1 | 0 |
| 1 | 1 | 0 | 0 | 0 | 0 | 1 | 0 | 0 | 0 | 0 | 1 | X | X | 0 | 1 |

Program 00101: Complementing subroutine, two cycle operation.

COMPLEMENTING SUBROUTINE FOR 11000 & 11100

| MEMORY ADDRESS | | | | | MEMORY CONTROLS | | BUSS BIAS | | | | ARITHMETIC CONTROLS | | | INTERVALS | |
|---|---|---|---|---|---|---|---|---|---|---|---|---|---|---|---|
| A4 | A3 | A2 | A1 | A0 | WE | RE | B3 | B2 | B1 | B0 | I/NI | CARRY | $C_{OUT}$ | $T_1$ | $T_2$ |
| 1 | 1 | 0 | 0 | 0 | 1 | 0 | 0 | 1 | 0 | 0 | X | 0 | X | 1 | 0 |
| 1 | 1 | 0 | 0 | 0 | 0 | 1 | — | — | — | — | 0 | 0 | X | 0 | 1 |
| 1 | 1 | 0 | 0 | 1 | 1 | 0 | 0 | 1 | 0 | 0 | X | 0 | X | 1 | 0 |
| 1 | 1 | 0 | 0 | 1 | 0 | 1 | — | — | — | — | 0 | 0 | X | 0 | 1 |
| 1 | 1 | 0 | 1 | 0 | 1 | 0 | 0 | 1 | 0 | 0 | X | 0 | X | 1 | 0 |
| 1 | 1 | 0 | 1 | 0 | 0 | 1 | — | — | — | — | 0 | 0 | X | 0 | 1 |
| 1 | 1 | 0 | 1 | 1 | 1 | 0 | 0 | 1 | 0 | 0 | X | 0 | X | 1 | 0 |
| 1 | 1 | 0 | 1 | 1 | 0 | 1 | — | — | — | — | 0 | 0 | X | 0 | 1 |
| 1 | 1 | 1 | 0 | 0 | 1 | 0 | 0 | 1 | 0 | 0 | X | 0 | X | 1 | 0 |
| 1 | 1 | 1 | 0 | 0 | 0 | 1 | — | — | — | — | 0 | 0 | X | 0 | 1 |
| 1 | 1 | 1 | 0 | 1 | 1 | 0 | 0 | 1 | 0 | 0 | X | 0 | X | 1 | 0 |
| 1 | 1 | 1 | 0 | 1 | 0 | 1 | — | — | — | — | 0 | 0 | X | 0 | 1 |
| 1 | 1 | 1 | 1 | 0 | 1 | 0 | 0 | 1 | 0 | 0 | X | 0 | X | 1 | 0 |
| 1 | 1 | 1 | 1 | 0 | 0 | 1 | — | — | — | — | 0 | 0 | X | 0 | 1 |
| 1 | 1 | 1 | 1 | 1 | 1 | 0 | 0 | 1 | 0 | 0 | X | 0 | X | 1 | 0 |
| 1 | 1 | 1 | 1 | 1 | 0 | 1 | — | — | — | — | 0 | 1 | X | 0 | 1 |

DIVISION SUBROUTINE FOR 10000 and 11000 & 11100

| MEMORY ADDRESS | | | | | MEMORY CONTROLS | | BUSS BIAS | | | | ARITHMETIC CONTROLS | | | INTERVALS | |
|---|---|---|---|---|---|---|---|---|---|---|---|---|---|---|---|
| A4 | A3 | A2 | A1 | A0 | WE | RE | B3 | B2 | B1 | B0 | I/NI | CARRY | $C_{OUT}$ | $T_1$ | $T_2$ |
| 1 | 0 | 0 | 0 | 0 | 1 | 0 | — | — | — | — | 1 | X | X | 1 | 0 |
| 1 | 1 | 0 | 0 | 0 | 0 | 1 | — | — | — | — | 1 | 1 | X | 0 | 1 |
| 1 | 0 | 0 | 0 | 1 | 1 | 0 | — | — | — | — | 1 | X | X | 1 | 0 |
| 1 | 1 | 0 | 0 | 1 | 0 | 1 | — | — | — | — | 1 | 1 | X | 0 | 1 |
| 1 | 0 | 0 | 1 | 0 | 1 | 0 | — | — | — | — | 1 | X | X | 1 | 0 |
| 1 | 1 | 0 | 1 | 0 | 0 | 1 | — | — | — | — | 1 | 1 | X | 0 | 1 |
| 1 | 0 | 0 | 1 | 1 | 1 | 0 | — | — | — | — | 1 | X | X | 1 | 0 |
| 1 | 1 | 0 | 1 | 1 | 0 | 1 | — | — | — | — | 1 | 1 | X | 0 | 1 |
| 1 | 1 | 1 | 0 | 0 | 1 | 1 | — | — | — | — | 1 | X | X | 1 | 0 |
| 1 | 1 | 1 | 0 | 0 | 0 | X | 0 | 0 | 0 | 0 | 1 | 1 | X | 0 | 1 |
| 1 | 1 | 1 | 0 | 1 | 1 | 1 | — | — | — | — | 1 | X | X | 1 | 0 |
| 1 | 1 | 1 | 0 | 1 | 0 | X | 0 | 0 | 0 | 0 | 1 | 1 | X | 0 | 1 |
| 1 | 1 | 1 | 1 | 0 | 1 | 1 | — | — | — | — | 1 | X | X | 1 | 0 |
| 1 | 1 | 1 | 1 | 0 | 0 | X | 0 | 0 | 0 | 0 | 1 | 1 | X | 0 | 1 |
| 1 | 1 | 1 | 1 | 1 | 1 | 1 | — | — | — | — | 1 | X | X | 1 | 0 |
| 1 | 1 | 1 | 1 | 1 | 0 | X | 0 | 0 | 0 | 0 | 1 | 1 | (1) | 0 | 1 |
| 0 | 0 | 0 | 0 | 0 | 1 | 1 | — | — | — | — | 1 | X | X | 1 | 0 |
| 0 | 0 | 0 | 0 | 0 | 0 | 0 | 0 | 0 | 0 | 1 | 1 | 1 | X | 0 | 1 |
| 0 | 0 | 0 | 0 | 1 | 1 | 1 | — | — | — | — | 1 | X | X | 1 | 0 |
| 0 | 0 | 0 | 0 | 1 | 0 | X | 0 | 0 | 0 | 0 | 1 | 1 | X | 0 | 1 |
| 0 | 0 | 0 | 1 | 0 | 1 | 1 | — | — | — | — | 1 | X | X | 1 | 0 |
| 0 | 0 | 0 | 1 | 0 | 0 | X | 0 | 0 | 0 | 0 | 1 | 1 | X | 0 | 1 |
| 0 | 0 | 0 | 1 | 1 | 1 | 1 | — | — | — | — | 1 | X | X | 1 | 0 |
| 0 | 0 | 0 | 1 | 1 | 0 | X | 0 | 0 | 0 | 0 | 1 | 1 | X | 0 | 1 |

Program 00110: Add by using Multiplication Subroutine but limit to single two-cycle operation, first two cycles, $A_4A_3A_2 (T_1) = 010$.

Program 00111: Same as 00001.

Program 01000: Same as 00100.

Program 01001: Divide as below. This is a three cycle operation but repetitive until an overflow carryout, $C_{OUT} = 1$, is detected during the end of second cycle at which time the program is stepped up to next subroutine.

Program 01010: Transfer according to Transfer Subroutine for 00100, one cycle operation.

Program 01011: Same as 00001.

Program 01100: Same as 00010.

Program 01101: Same as 00011.

Program 01110: Same as 00110, limit to first two cycles.

Program 01111: Shift-Down as shown below, two cycles.

| SHIFT-DOWN SUBROUTINE FOR 11000 & 11100 | | | | | | | | | | | | | | |
|---|---|---|---|---|---|---|---|---|---|---|---|---|---|---|
| MEMORY ADDRESS | | | | | MEMORY CONTROLS | | BUSS BIAS | | | | ARITHMETIC CONSTROLS | | | INTERVALS | |
| A4 | A3 | A2 | A1 | A0 | WE | RE | B3 | B2 | B1 | B0 | I/NI | CARRY | $C_{OUT}$ | $T_1$ | $T_2$ |
| 1 | 1 | 0 | 0 | 1 | 1 | 1 | — | — | — | — | 1 | X | X | 1 | 0 |
| 1 | 1 | 0 | 0 | 0 | 0 | 1 | 0 | 0 | 0 | 0 | 1 | X | X | 0 | 1 |
| 1 | 1 | 0 | 1 | 0 | 1 | 1 | — | — | — | — | 1 | X | X | 1 | 0 |
| 1 | 1 | 0 | 0 | 1 | 0 | 1 | 0 | 0 | 0 | 0 | 1 | X | X | 0 | 1 |
| 1 | 1 | 0 | 1 | 1 | 1 | 1 | — | — | — | — | 1 | X | X | 1 | 0 |
| 1 | 1 | 0 | 1 | 0 | 0 | 1 | 0 | 0 | 0 | 0 | 1 | X | X | 0 | 1 |
| 1 | 1 | 1 | 0 | 0 | 1 | 1 | — | — | — | — | 1 | X | X | 1 | 0 |
| 1 | 1 | 0 | 1 | 1 | 0 | 1 | 0 | 0 | 0 | 0 | 1 | X | X | 0 | 1 |
| 1 | 1 | 1 | 0 | 1 | 1 | 1 | — | — | — | — | 1 | X | X | 1 | 0 |
| 1 | 1 | 1 | 0 | 0 | 0 | 1 | 0 | 0 | 0 | 0 | 1 | X | X | 0 | 1 |
| 1 | 1 | 1 | 1 | 0 | 1 | 1 | — | — | — | — | 1 | X | X | 1 | 0 |
| 1 | 1 | 1 | 0 | 1 | 0 | 1 | 0 | 0 | 0 | 0 | 1 | X | X | 0 | 1 |
| 1 | 1 | 1 | 1 | 1 | 1 | 1 | — | — | — | — | 1 | X | X | 1 | 0 |
| 1 | 1 | 1 | 1 | 0 | 0 | 1 | 0 | 0 | 0 | 0 | 1 | X | X | 0 | 1 |
| 1 | 1 | X | 0 | 0 | 1 | 1 | 0 | 0 | 0 | 0 | 1 | X | X | 1 | 0 |
| 1 | 1 | 1 | 1 | 1 | 0 | 1 | 0 | 0 | 0 | 0 | 1 | X | X | 0 | 1 |

Program 10000: Same as 01111.
Program 10001: Same as 00110.
Program 10010: Same as 00101.
Program 10011: Same as 00110, except $A_4A_3A_2$ ($T_1$)=011.
Program 10100: Same as 00001.
Program 10101: Same as 00100.
Program 10110: Same as 00100.
Program 10111: Same as 00100.
Program 11000: Same as 00100.
Program 11001: Same as 01001, except $A_4A_3A_2$ ($T_2$) = 101.
Program 11010: Same as in Multiplication Subroutine but the operation is limited to the first cycle operation with memory address $A_4A_3A_2$ being 000.
Program 11011: Same as 01111 but limit to one cycle operation with $A_4A_3A_2$ = 000.
Program 11100: Stop.

MACHINE CONSTRUCTION

The designed microcomputer was built using available components, standard TTL SN7400 series logical family. The construction was done on two boards, in the size of approximately 8¼ × 11 inches, with LED (light emitting diodes) display and buttons on separate module. A portable battery was used as a power unit.

While the invention has been described with respect to a particular mathematical equation for calculating speed rating given specified input data, the invention might also be used for other equations to calculate speed rating or the method according to the present invention might be used to calculate other results than a speed rating.

While the present invention has been described with reference to preferred embodiments thereof, it is understood by those skilled in the art that various changes in form and application of the electronic speed rating calculator and method may be made without departing from the spirit or scope of the invention.

What is claimed is:

1. An automatic speed rating computer for determining the speed rating of an entrant in a speed contest over a predetermined distance comprising, in combination:

a first register for storing a signal indicative of a predetermined distance, a second register for storing a signal indicative of the desired entrant, which further comprises a signal indicative of the distance the desired entrant was behind a winning entrant at the completion of the predetermined distance by the winner, a third register for storing a signal indicative of the time of the entrant who is the winner, of the contest to complete the predetermined distance, means for accessing the signal from the first register, means for selectively accessing the signal from the second register and subtracting means for subtracting the signal from the second register from the signal from the first register, division means for dividing the result of the aforesaid subtraction by the signal from the third register, a first memory for selectively providing a signal indicative of a constant factor, multiplication means for multiplying the signal from the first register by the signal from the first memory, and means for adding the result of said multiplication to the result of said aforesaid division to determine a speed rating, means for accessing another constant and subtracting said constant from said aforesaid addition, said constant being based on the ordinate intersection of the slope of a line which forms the linear relationship between speed and distance for a zero speed rating, and all of said means being operating in accordance with the relationship:

$$\text{Speed Rating} = \frac{\frac{(f\,60 - L)}{(t)} + .07f - 4.92}{0.008}$$

where f is the predetermined distance in furlongs of the race and L is the distance in furlongs the entrant is behind the winner and t is the time in seconds it takes the winner to complete the race over the predetermined distance.

2. The automatic speed rating computer according to claim 1 wherein the entrants are horses and the race is a horse race.

* * * * *